US012676954B2

(12) United States Patent
Midkiff et al.

(10) Patent No.: US 12,676,954 B2
(45) Date of Patent: Jul. 7, 2026

(54) TECHNOLOGIES FOR SOURCE DEGRADATION DETECTION AND AUTO-TUNING OF CAMERAS

(71) Applicant: Intel Corporation, Santa Clara, CA (US)

(72) Inventors: Kevin M. Midkiff, Beaverton, OR (US); Rita H. Wouhaybi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/952,190

(22) Filed: Sep. 23, 2022

(65) Prior Publication Data

US 2023/0020182 A1 Jan. 19, 2023

(51) Int. Cl.
H04N 17/00 (2006.01)
H04N 23/60 (2023.01)
H04N 23/66 (2023.01)

(52) U.S. Cl.
CPC ........... H04N 17/002 (2013.01); H04N 23/64 (2023.01); H04N 23/66 (2023.01)

(58) Field of Classification Search
CPC ...... H04N 17/002; H04N 23/64; H04N 23/66; H04N 23/617; H04N 23/661
See application file for complete search history.

(56) References Cited

U.S. PATENT DOCUMENTS

2005/0074140 A1* 4/2005 Grasso ............. G08B 13/19632
382/103
2006/0225120 A1* 10/2006 Lee .................... H04N 21/4363
725/100

2014/0079314 A1 3/2014 Yakubovich et al.
2019/0025773 A1* 1/2019 Yang .................... G06V 10/764
2019/0197357 A1* 6/2019 Anderson ............. G06F 18/217
2020/0096995 A1 3/2020 Cella et al.
2020/0112726 A1* 4/2020 Liu ...................... H04N 19/172
2021/0081712 A1* 3/2021 Saunders ................ G06T 15/30
2021/0092290 A1* 3/2021 Takami .................. H04N 23/69
2021/0183179 A1* 6/2021 Agarwal ............... G01S 7/4972
2022/0036164 A1* 2/2022 Kale ..................... G06N 3/088
2022/0164933 A1* 5/2022 Parameswaran .......... G06T 5/50
2022/0329157 A1* 10/2022 Pillonnet .......... H01M 10/0585
2023/0120604 A1* 4/2023 Donohoe ............. H04N 23/633
348/187
2023/0267335 A1* 8/2023 Nitzan ................... G06N 3/047
706/25

* cited by examiner

*Primary Examiner* — Michael Lee

(74) *Attorney, Agent, or Firm* — Alliance IP, LLC

(57) ABSTRACT

Technologies for source degradation and auto-tuning of cameras are disclosed. In one embodiment, a system includes a compute node connected to one or more cameras. The cameras can monitor an environment, such as a manufacturing process in a factory. The compute node may use image processing, such as a machine-learning-based algorithm, to monitor processes. A system integrator may adjust parameters of the camera and/or the algorithm, such as focus, gain, contrast, white balance, etc. The compute node can monitor the system integrator and learn how to adjust parameters in order to improve key performance indicators (KPIs) of the monitored process. In a production environment, the compute node may then automatically adjust parameters of the camera and/or analysis algorithm based on the actions of the system integrator in order to improve performance of the analysis algorithm.

25 Claims, 15 Drawing Sheets

REFERENCE POINT NAMES:
Mp: MEC PLATFORM FUNCTIONALITY
Mm: MANAGEMENT
Mx: CONNECTIONS TO EXTERNAL ENTITIES

1100

TECHNOLOGIES FOR SOURCE DEGRADATION DETECTION AND AUTO-TUNING OF CAMERAS

BACKGROUND

Image processing may be used to monitor various embodiments, such as quality control of products in a factory. A system integrator may optimize camera settings, algorithm parameters, etc., to improve the performance of an algorithm. However, over time, the environment may change due to lighting changes, dust on the camera, air quality, etc., affecting the quality of the image processing algorithm.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Embodiments will focus on learning that is collaborative, hierarchical, and that uses distributed datasets/datapoints and processing while aiming to preserve privacy. Some embodiments advantageously draw on opportunities provided by resource rich, real-time compute environments offered by wireless edge networks to exploit sensing, compute, communication and storage resources, to lower latency and communication costs including by way of radio resource management, to increase privacy (for example by transferring results instead of raw data), to automate and scale ML training, to exploit wireless for computation including over the air combining, and to promote multi-stage learning.

Sections A through G. below will provide an overview of configurations for edge computing, such as wireless edge computing, including, respectively, overviews of edge computing, usage of containers in edge computing, mobility and multi-access edge computing (MEC) in edge computing settings, computing architectures and systems, machine readable medium and distributed software instructions, a satellite edge connectivity use case, software distribution in edge computing settings. Section H provides an overview of machine learning in edge computing networks.

Sections I through K provide a detailed description of some respective demonstrative embodiments that address challenges of developing globally accurate learning models over wireless edge networks with distributed data. Aspects of embodiments described in any one of Sections I through K (relating, respectively, to a first set of embodiments, a second set of embodiments, and a third set of embodiments) may be combined with other aspects described in any one of the same Sections as would be recognized by one skilled in the art. Embodiments of Sections I through K may be deployed or implemented using any of the configurations or environments described in any of Sections A through G described below.

A. Overviews of Edge Computing

Figure 1:
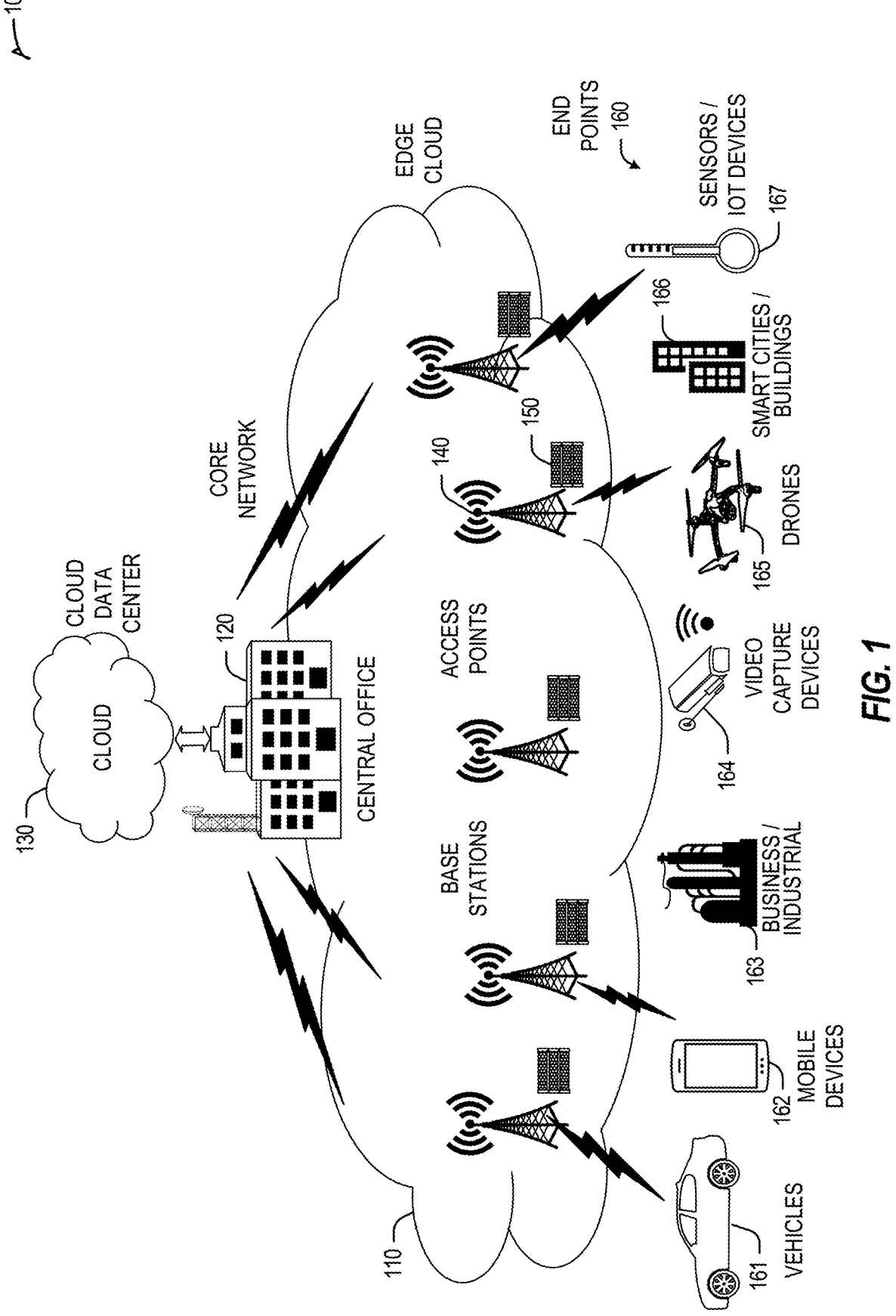
FIG. 1 illustrates an overview of an edge cloud configuration for edge computing.

FIG. 1 is a block diagram 100 showing an overview of a configuration for edge computing, which includes a layer of processing referred to in many of the following examples as an "edge cloud". As shown, the edge cloud 110 is co-located at an edge location, such as an access point or base station 140, a local processing hub 150, or a central office 120, and thus may include multiple entities, devices, and equipment instances. The edge cloud 110 is located much closer to the endpoint (consumer and producer) data sources 160 (e.g., autonomous vehicles 161, user equipment 162, business and industrial equipment 163, video capture devices 164, drones 165, smart cities and building devices 166, sensors and IoT devices 167, etc.) than the cloud data center 130. Compute, memory, and storage resources which are offered at the edges in the edge cloud 110 are critical to providing ultra-low latency response times for services and functions used by the endpoint data sources 160 as well as reduce network backhaul traffic from the edge cloud 110 toward cloud data center 130 thus improving energy consumption and overall network usages among other benefits.

Compute, memory, and storage are scarce resources, and generally decrease depending on the edge location (e.g., fewer processing resources being available at consumer endpoint devices, than at a base station, than at a central office). However, the closer that the edge location is to the endpoint (e.g., user equipment (UE)), the more that space and power is often constrained. Thus, edge computing attempts to reduce the amount of resources needed for network services, through the distribution of more resources which are located closer both geographically and in network access time. In this manner, edge computing attempts to bring the compute resources to the workload data where appropriate, or, bring the workload data to the compute resources.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge", "close edge", "local edge", "middle edge", or "far edge" layers, depending on latency, distance, and timing characteristics.

Edge computing is a developing paradigm where computing is performed at or closer to the "edge" of a network, typically through the use of a compute platform (e.g., x86 or ARM compute hardware architecture) implemented at base stations, gateways, network routers, or other devices which are much closer to endpoint devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

Figure 2:
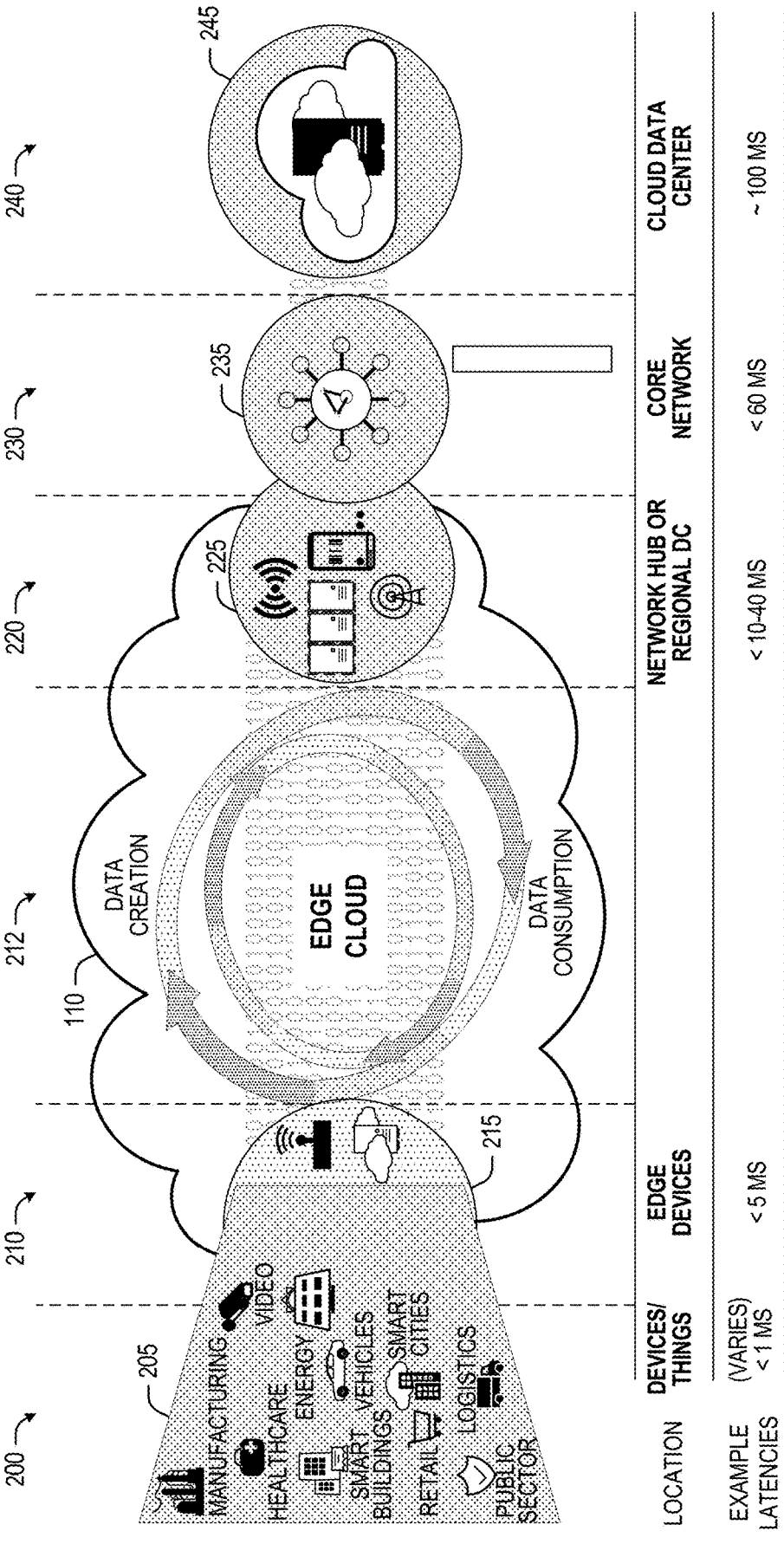
FIG. 2 illustrates operational layers among endpoints, an edge cloud, and cloud computing environments.

FIG. 2 illustrates operational layers among endpoints, an edge cloud, and cloud computing environments. Specifically, FIG. 2 depicts examples of computational use cases 205, utilizing the edge cloud 110 among multiple illustrative layers of network computing. The layers begin at an endpoint (devices and things) layer 200, which accesses the edge cloud 110 to conduct data creation, analysis, and data consumption activities. The edge cloud 110 may span multiple network layers, such as an edge devices layer 210 having gateways, on-premise servers, or network equipment (nodes 215) located in physically proximate edge systems; a network access layer 220, encompassing base stations, radio processing units, network hubs, regional data centers (DC), or local network equipment (equipment 225); and any equipment, devices, or nodes located therebetween (in layer 212, not illustrated in detail). The network communications within the edge cloud 110 and among the various layers may occur via any number of wired or wireless mediums, including via connectivity architectures and technologies not depicted.

Examples of latency, resulting from network communication distance and processing time constraints, may range from less than a millisecond (ms) when among the endpoint layer 200, under 5 ms at the edge devices layer 210, to even between 10 to 40 ms when communicating with nodes at the network access layer 220. Beyond the edge cloud 110 are core network 230 and cloud data center 240 layers, each with increasing latency (e.g., between 50-60 ms at the core network layer 230, to 100 or more ms at the cloud data center layer). As a result, operations at a core network data center 235 or a cloud data center 245, with latencies of at least 50 to 100 ms or more, will not be able to accomplish many time-critical functions of the use cases 205. Each of these latency values are provided for purposes of illustration and contrast; it will be understood that the use of other access network mediums and technologies may further reduce the latencies. In some examples, respective portions of the network may be categorized as "close edge", "local edge", "near edge", "middle edge", or "far edge" layers, relative to a network source and destination. For instance, from the perspective of the core network data center 235 or a cloud data center 245, a central office or content data network may be considered as being located within a "near edge" layer ("near" to the cloud, having high latency values when communicating with the devices and endpoints of the use cases 205), whereas an access point, base station, on-premise server, or network gateway may be considered as located within a "far edge" layer ("far" from the cloud, having low latency values when communicating with the devices and endpoints of the use cases 205). It will be understood that other categorizations of a particular network layer as constituting a "close", "local", "near", "middle", or "far" edge may be based on latency, distance, number of network hops, or other measurable characteristics, as measured from a source in any of the network layers 200-240.

The various use cases 205 may access resources under usage pressure from incoming streams, due to multiple services utilizing the edge cloud. To achieve results with low latency, the services executed within the edge cloud 110 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to Service Level Agreement (SLA), the system as a whole (components in the transaction) may provide the ability to (1) understand the impact of the SLA violation, and (2) augment other components in the system to resume overall transaction SLA, and (3) implement steps to remediate.

Thus, with these variations and service features in mind, edge computing within the edge cloud 110 may provide the ability to serve and respond to multiple applications of the use cases 205 (e.g., object tracking, video surveillance, connected cars, etc.) in real-time or near real-time, and meet ultra-low latency requirements for these multiple applications. These advantages enable a whole new class of applications (e.g., Virtual Network Functions (VNFs), Function as a Service (FaaS), Edge as a Service (EaaS), standard processes, etc.), which cannot leverage conventional cloud computing due to latency or other limitations.

However, with the advantages of edge computing comes the following caveats. The devices located at the edge are often resource constrained and therefore there is pressure on usage of edge resources. Typically, this is addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required, because edge locations may be unmanned and may even need permissioned access (e.g., when housed in a third-party location). Such issues are magnified in the edge cloud 110 in a multi-tenant, multi-owner, or multi-access setting, where services and applications are requested by many users, especially as network usage dynamically fluctuates and the composition of the multiple stakeholders, use cases, and services changes.

At a more generic level, an edge computing system may be described to encompass any number of deployments at the previously discussed layers operating in the edge cloud 110 (network layers 200-240), which provide coordination from client and distributed computing devices. One or more edge gateway nodes, one or more edge aggregation nodes, and one or more core data centers may be distributed across layers of the network to provide an implementation of the edge computing system by or on behalf of a telecommunication service provider ("telco", or "TSP"), internet-of-things service provider, cloud service provider (CSP), enterprise entity, or any other number of entities. Various implementations and configurations of the edge computing system may be provided dynamically, such as when orchestrated to meet service objectives.

Consistent with the Examples provided herein, a client computing node may be embodied as any type of endpoint component, device, appliance, or other thing capable of communicating as a producer or consumer of data. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected hardware or software configurations to facilitate or use the edge cloud 110.

As such, the edge cloud 110 is formed from network components and functional features operated by and within edge gateway nodes, edge aggregation nodes, or other edge computing nodes among network layers 210-230. The edge cloud 110 thus may be embodied as any type of network that provides edge computing and/or storage resources which are proximately located to radio access network (RAN) capable endpoint devices (e.g., mobile computing devices, IoT devices, smart devices, etc., which are discussed herein. In other words, the edge cloud 110 may be envisioned as an "edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

The network components of the edge cloud 110 may be servers, multi-tenant servers, appliance computing devices, and/or any other type of computing devices. For example, the edge cloud 110 may include an appliance computing device that is a self-contained electronic device including a housing, a chassis, a case or a shell. In some circumstances, the housing may be dimensioned for portability such that it can be carried by a human and/or shipped. Example housings may include materials that form one or more exterior surfaces that partially or fully protect contents of the appliance, in which protection may include weather protection, hazardous environment protection (e.g., EMI, vibration, extreme temperatures), and/or enable submergibility. Example housings may include power circuitry to provide power for stationary and/or portable implementations, such as AC power inputs, DC power inputs, AC/DC or DC/AC converter(s), power regulators, transformers, charging circuitry, batteries, wired inputs and/or wireless power inputs. Example housings and/or surfaces thereof may include or connect to mounting hardware to enable attachment to structures such as buildings, telecommunication structures (e.g., poles, antenna structures, etc.), and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, propellers, etc.) and/or articulating hardware (e.g., robot arms, pivotable appendages, etc.). In some circumstances, the sensors may include any type of input devices such as user interface hardware (e.g., buttons, switches, dials, sliders, etc.). In some circumstances, example housings include output devices contained in, carried by, embedded therein and/or attached thereto. Output devices may include displays, touchscreens, lights, LEDs, speakers, I/O ports (e.g., USB), etc. In some circumstances, edge devices are devices presented in the network for a specific purpose (e.g., a traffic light), but may have processing and/or other capacities that may be utilized for other purposes. Such edge devices may be independent from other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIG. 8. The edge cloud 110 may also include one or more servers and/or one or more multi-tenant servers. Such a server may include an operating system and implement a virtual computing environment. A virtual computing environment may include a hypervisor managing (e.g., spawning, deploying, destroying, etc.) one or more virtual machines, one or more containers, etc. Such virtual computing environments provide an execution environment in which one or more applications and/or other software, code or scripts may execute while being isolated from one or more other applications, software, code or scripts.

Figure 3:
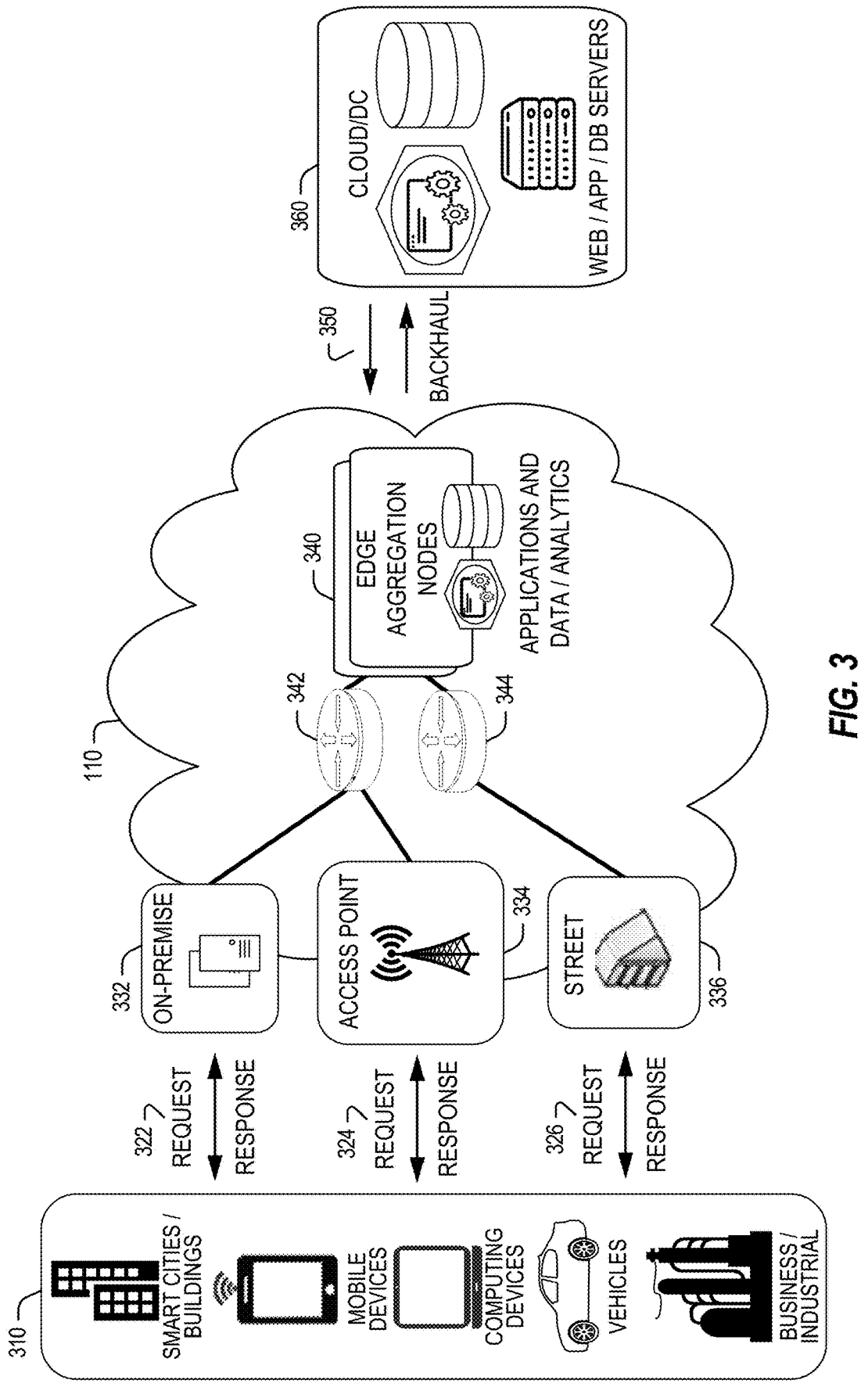
FIG. 3 illustrates an example approach for networking and services in an edge computing system.

In FIG. 3, various client endpoints 310 (in the form of mobile devices, computers, autonomous vehicles, business computing equipment, industrial processing equipment) exchange requests and responses that are specific to the type of endpoint network aggregation. For instance, client endpoints 310 may obtain network access via a wired broadband network, by exchanging requests and responses 322 through an on-premise network system 332. Some client endpoints 310, such as mobile computing devices, may obtain network access via a wireless broadband network, by exchanging requests and responses 324 through an access point (e.g., cellular network tower) 334. Some client endpoints 310, such as autonomous vehicles may obtain network access for requests and responses 326 via a wireless vehicular network through a street-located network system 336. However, regardless of the type of network access, the TSP may deploy aggregation points 342, 344 within the edge cloud 110 to aggregate traffic and requests. Thus, within the edge cloud 110, the TSP may deploy various compute and storage resources, such as at edge aggregation nodes 340, to provide requested content. The edge aggregation nodes 340 and other systems of the edge cloud 110 are connected to a cloud or data center 360, which uses a backhaul network 350 to fulfill higher-latency requests from a cloud/data center for websites, applications, database servers, etc. Additional or consolidated instances of the edge aggregation nodes 340 and the aggregation points 342, 344, including those deployed on a single server framework, may also be present within the edge cloud 110 or other areas of the TSP infrastructure.

B. Usage of Containers in Edge Computing

Figure 4:
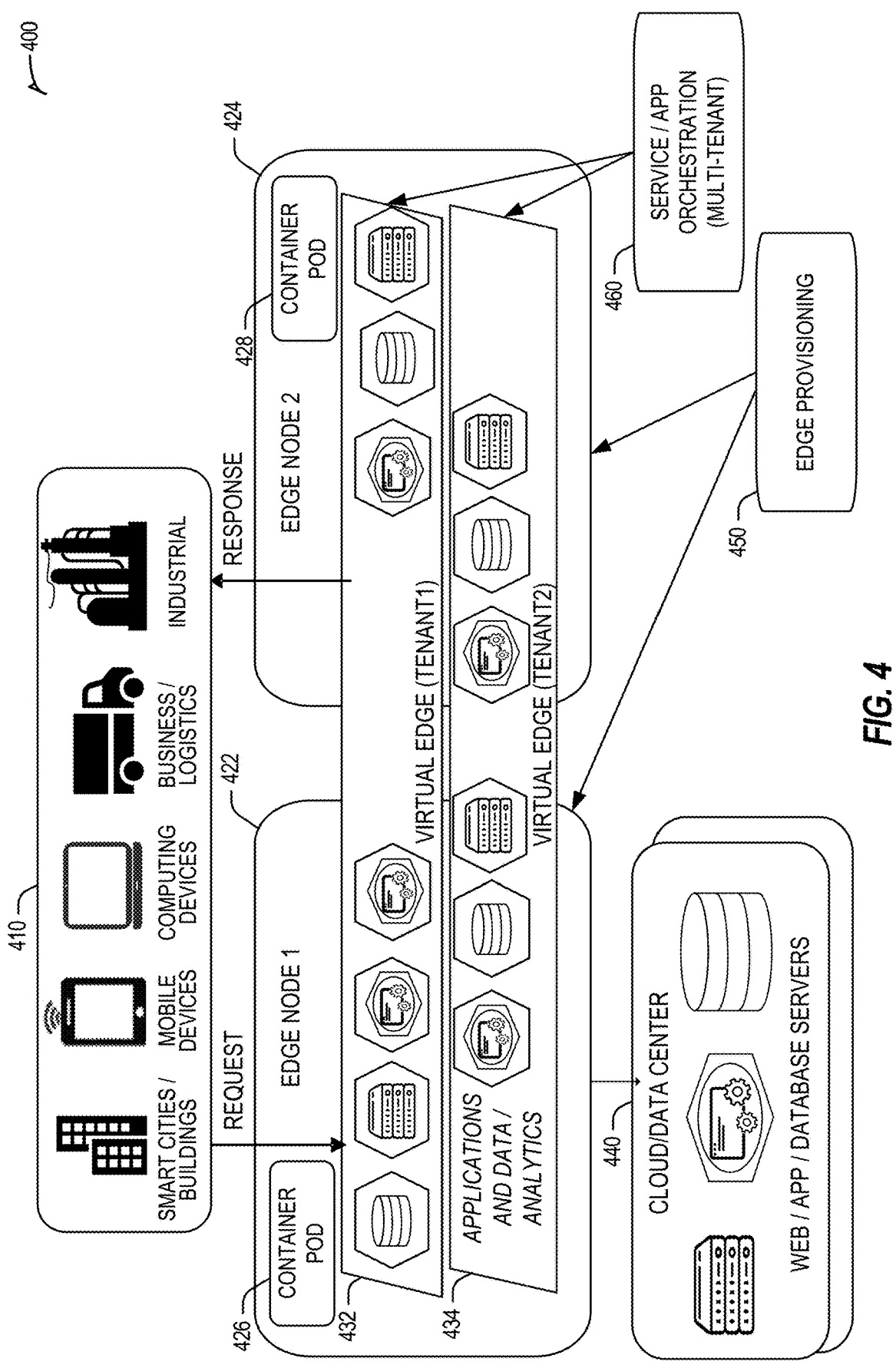
FIG. 4 illustrates deployment of a virtual edge configuration in an edge computing system operated among multiple edge nodes and multiple tenants.

FIG. 4 illustrates deployment and orchestration for virtualized and container-based edge configurations across an edge computing system operated among multiple edge nodes and multiple tenants (e.g., users, providers) which use such edge nodes. Specifically, FIG. 4 depicts coordination of a first edge node 422 and a second edge node 424 in an edge computing system 400, to fulfill requests and responses for various client endpoints 410 (e.g., smart cities/building systems, mobile devices, computing devices, business/logistics systems, industrial systems, etc.), which access various virtual edge instances. Here, the virtual edge instances 432, 434 provide edge compute capabilities and processing in an edge cloud, with access to a cloud/data center 440 for higher-latency requests for websites, applications, database servers, etc. However, the edge cloud enables coordination of processing among multiple edge nodes for multiple tenants or entities.

In the example of FIG. 4, these virtual edge instances include: a first virtual edge 432, offered to a first tenant (Tenant 1), which offers a first combination of edge storage, computing, and services; and a second virtual edge 434, offering a second combination of edge storage, computing, and services. The virtual edge instances 432, 434 are distributed among the edge nodes 422, 424, and may include scenarios in which a request and response are fulfilled from the same or different edge nodes. The configuration of the edge nodes 422, 424 to operate in a distributed yet coordinated fashion occurs based on edge provisioning functions 450. The functionality of the edge nodes 422, 424 to provide coordinated operation for applications and services, among multiple tenants, occurs based on orchestration functions 460.

It should be understood that some of the devices in 410 are multi-tenant devices where Tenant 1 may function within a tenant1 'slice' while a Tenant 2 may function within a tenant2 slice (and, in further examples, additional or subtenants may exist; and each tenant may even be specifically entitled and transactionally tied to a specific set of features all the way day to specific hardware features). A trusted multi-tenant device may further contain a tenant specific cryptographic key such that the combination of key and slice may be considered a "root of trust" (RoT) or tenant specific RoT. A RoT may further be computed dynamically composed using a DICE (Device Identity Composition Engine) architecture such that a single DICE hardware building block may be used to construct layered trusted computing base contexts for layering of device capabilities (such as a Field Programmable Gate Array (FPGA)). The RoT may further be used for a trusted computing context to enable a "fan-out" that is useful for supporting multi-tenancy. Within a multi-tenant environment, the respective edge nodes 422, 424 may operate as security feature enforcement points for local resources allocated to multiple tenants per node. Additionally, tenant runtime and application execution (e.g., in instances 432, 434) may serve as an enforcement point for a security feature that creates a virtual edge abstraction of resources spanning potentially multiple physical hosting platforms. Finally, the orchestration functions 460 at an orchestration entity may operate as a security feature enforcement point for marshalling resources along tenant boundaries.

Edge computing nodes may partition resources (memory, central processing unit (CPU), graphics processing unit (GPU), interrupt controller, input/output (I/O) controller, memory controller, bus controller, etc.) where respective partitionings may contain a RoT capability and where fan-out and layering according to a DICE model may further be applied to Edge Nodes. Cloud computing nodes may use containers, FaaS engines, Servlets, servers, or other computation abstraction that may be partitioned according to a DICE layering and fan-out structure to support a RoT context for each. Accordingly, the respective RoTs spanning devices 410, 422, and 440 may coordinate the establishment of a distributed trusted computing base (DTCB) such that a tenant-specific virtual trusted secure channel linking all elements end to end can be established.

Further, it will be understood that a container may have data or workload specific keys protecting its content from a previous edge node. As part of migration of a container, a pod controller at a source edge node may obtain a migration key from a target edge node pod controller where the migration key is used to wrap the container-specific keys. When the container/pod is migrated to the target edge node, the unwrapping key is exposed to the pod controller that then decrypts the wrapped keys. The keys may now be used to perform operations on container specific data. The migration functions may be gated by properly attested edge nodes and pod managers (as described above).

In further examples, an edge computing system is extended to provide for orchestration of multiple applications through the use of containers (a contained, deployable unit of software that provides code and needed dependencies) in a multi-owner, multi-tenant environment. A multi-tenant orchestrator may be used to perform key management, trust anchor management, and other security functions related to the provisioning and lifecycle of the trusted 'slice' concept in FIG. 4. For instance, an edge computing system may be configured to fulfill requests and responses for various client endpoints from multiple virtual edge instances (and, from a cloud or remote data center). The use of these virtual edge instances may support multiple tenants and multiple applications (e.g., augmented reality (AR)/virtual reality (VR), enterprise applications, content delivery, gaming, compute offload) simultaneously. Further, there may be multiple types of applications within the virtual edge instances (e.g., normal applications; latency sensitive applications; latency-critical applications; user plane applications; networking applications; etc.). The virtual edge instances may also be spanned across systems of multiple owners at different geographic locations (or, respective computing systems and resources which are co-owned or co-managed by multiple owners).

For instance, each edge node 422, 424 may implement the use of containers, such as with the use of a container "pod" 426, 428 providing a group of one or more containers. In a setting that uses one or more container pods, a pod controller or orchestrator is responsible for local control and orchestration of the containers in the pod. Various edge node resources (e.g., storage, compute, services, depicted with hexagons) provided for the respective edge slices 432, 434 are partitioned according to the needs of each container.

With the use of container pods, a pod controller oversees the partitioning and allocation of containers and resources. The pod controller receives instructions from an orchestrator (e.g., orchestrator 460) that instructs the controller on how best to partition physical resources and for what duration, such as by receiving key performance indicator (KPI) targets based on SLA contracts. The pod controller determines which container requires which resources and for how long in order to complete the workload and satisfy the SLA. The pod controller also manages container lifecycle operations such as: creating the container, provisioning it with resources and applications, coordinating intermediate results between multiple containers working on a distributed application together, dismantling containers when workload completes, and the like. Additionally, a pod controller may serve a security role that prevents assignment of resources until the right tenant authenticates or prevents provisioning of data or a workload to a container until an attestation result is satisfied.

Also, with the use of container pods, tenant boundaries can still exist but in the context of each pod of containers. If each tenant specific pod has a tenant specific pod controller, there will be a shared pod controller that consolidates resource allocation requests to avoid potential resource starvation situations. Further controls may be provided to ensure attestation and trustworthiness of the pod and pod controller. For instance, the orchestrator 460 may provision an attestation verification policy to local pod controllers that perform attestation verification. If an attestation satisfies a policy for a first tenant pod controller but not a second tenant pod controller, then the second pod could be migrated to a different edge node that does satisfy it. Alternatively, the first pod may be allowed to execute and a different shared pod controller is installed and invoked prior to the second pod executing.

Figure 5:
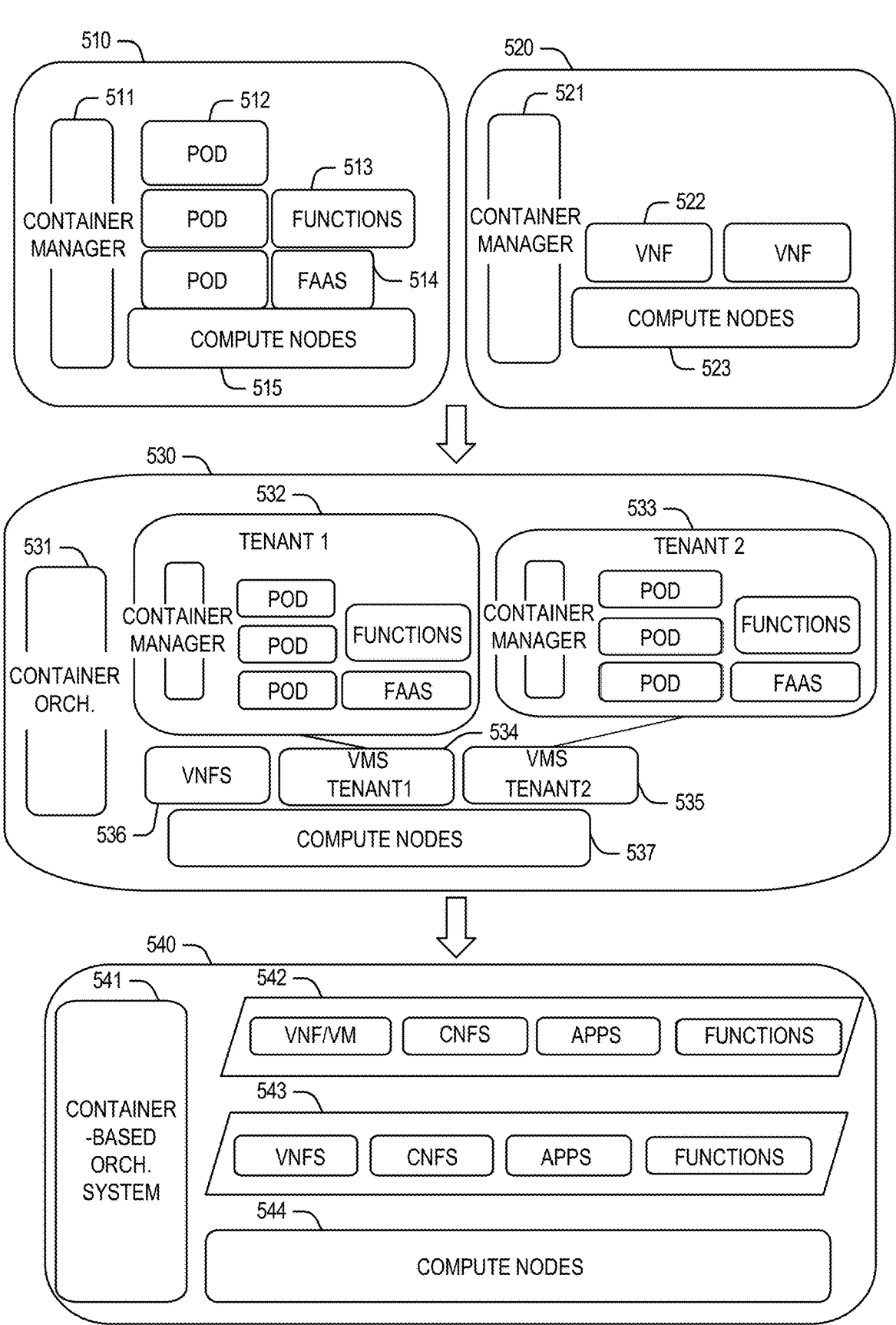
FIG. 5 illustrates various compute arrangements deploying containers in an edge computing system.

FIG. 5 illustrates additional compute arrangements deploying containers in an edge computing system. As a simplified example, system arrangements 510, 520 depict settings in which a pod controller (e.g., container managers 511, 521, and container orchestrator 531) is adapted to launch containerized pods, functions, and functions-as-a-service instances through execution via computing nodes (515 in arrangement 510), or to separately execute containerized virtualized network functions through execution via computing nodes (523 in arrangement 520). This arrangement is adapted for use of multiple tenants in system arrangement 530 (using computing nodes 537), where containerized pods (e.g., pods 512), functions (e.g., functions 513, VNFs 522, 536), and functions-as-a-service instances (e.g., FaaS instance 514) are launched within virtual machines (e.g., VMs 534, 535 for tenants 532, 533) specific to respective tenants (aside the execution of virtualized network functions). This arrangement is further adapted for use in system arrangement 540, which provides containers 542, 543, or execution of the various functions, applications, and functions on computing nodes 544, as coordinated by an container-based orchestration system 541.

The system arrangements of depicted in FIG. 5 provides an architecture that treats VMs, Containers, and Functions equally in terms of application composition (and resulting applications are combinations of these three ingredients). Each ingredient may involve use of one or more accelerator (FPGA, ASIC) components as a local backend. In this manner, applications can be split across multiple edge owners, coordinated by an orchestrator.

In the context of FIG. 5, the pod controller/container manager, container orchestrator, and individual nodes may provide a security enforcement point. However, tenant isolation may be orchestrated where the resources allocated to a tenant are distinct from resources allocated to a second tenant, but edge owners cooperate to ensure resource allocations are not shared across tenant boundaries. Or, resource allocations could be isolated across tenant boundaries, as tenants could allow "use" via a subscription or transaction/contract basis. In these contexts, virtualization, containerization, enclaves and hardware partitioning schemes may be used by edge owners to enforce tenancy. Other isolation environments may include: bare metal (dedicated) equipment, virtual machines, containers, virtual machines on containers, or combinations thereof.

In further examples, aspects of software-defined or controlled silicon hardware, and other configurable hardware, may integrate with the applications, functions, and services an edge computing system. Software defined silicon (SDSi) may be used to ensure the ability for some resource or hardware ingredient to fulfill a contract or service level agreement, based on the ingredient's ability to remediate a portion of itself or the workload (e.g., by an upgrade, reconfiguration, or provision of new features within the hardware configuration itself).

C. Mobility and Multi-Access Edge Computing (MEC) in Edge Computing Settings

Figure 6:
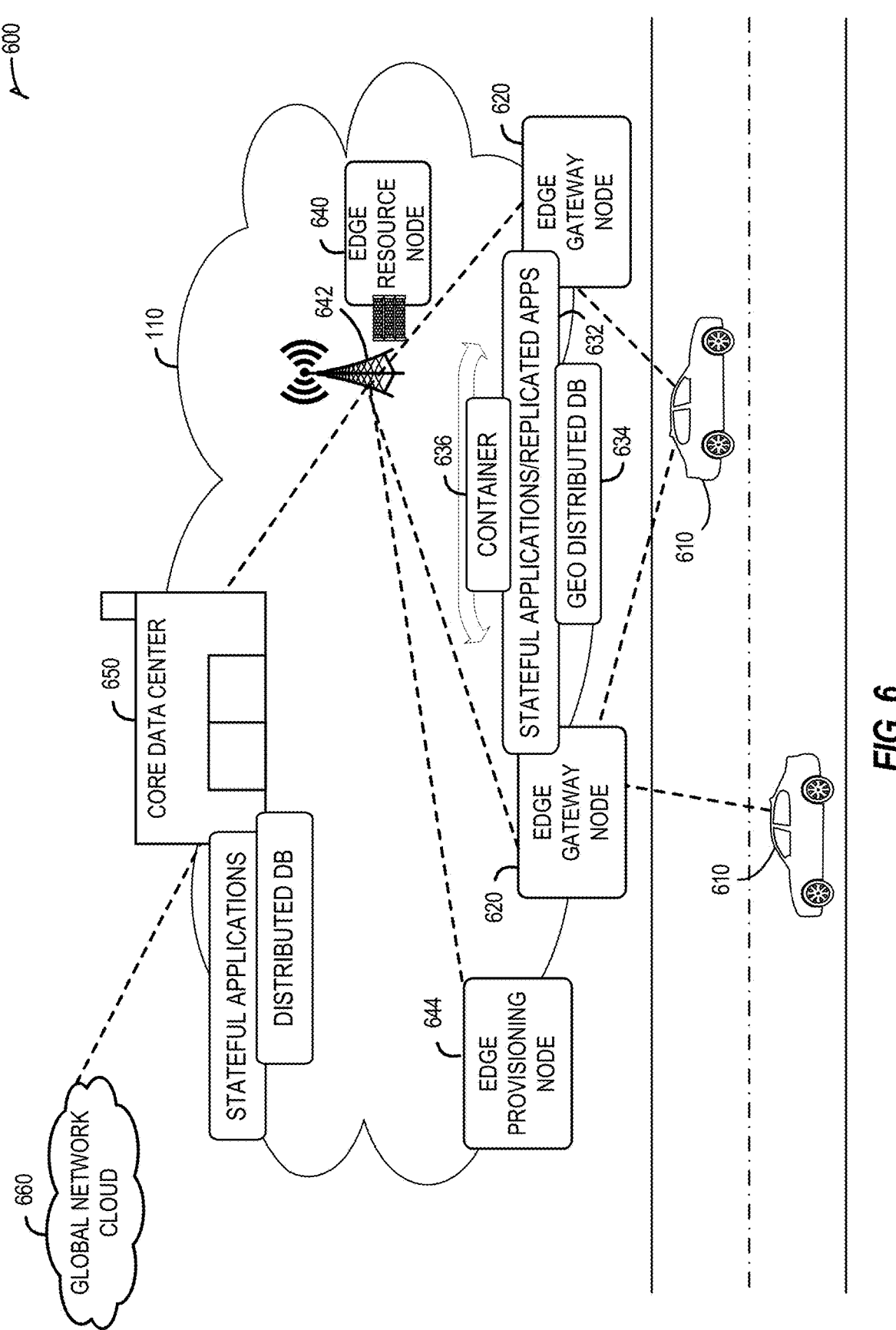
FIG. 6 illustrates a compute and communication use case involving mobile access to applications in an edge computing system.

It should be appreciated that the edge computing systems and arrangements discussed herein may be applicable in various solutions, services, and/or use cases involving mobility. As an example, FIG. 6 shows a simplified vehicle compute and communication use case involving mobile access to applications in an edge computing system 600 that implements an edge cloud 110. In this use case, respective client computing nodes 610 may be embodied as in-vehicle compute systems (e.g., in-vehicle navigation and/or infotainment systems) located in corresponding vehicles which communicate with the edge gateway nodes 620 during traversal of a roadway. For instance, the edge gateway nodes 620 may be located in a roadside cabinet or other enclosure built-into a structure having other, separate, mechanical utility, which may be placed along the roadway, at intersections of the roadway, or other locations near the roadway. As respective vehicles traverse along the roadway, the connection between its client computing node 610 and a particular edge gateway device 620 may propagate so as to maintain a consistent connection and context for the client computing node 610. Likewise, mobile edge nodes may aggregate at the high priority services or according to the throughput or latency resolution requirements for the underlying service(s) (e.g., in the case of drones). The respective edge gateway devices 620 include an amount of processing and storage capabilities and, as such, some processing and/or storage of data for the client computing nodes 610 may be performed on one or more of the edge gateway devices 620.

The edge gateway devices 620 may communicate with one or more edge resource nodes 640, which are illustratively embodied as compute servers, appliances or components located at or in a communication base station 642 (e.g., a base station of a cellular network). As discussed above, the respective edge resource nodes 640 include an amount of processing and storage capabilities and, as such, some processing and/or storage of data for the client computing nodes 610 may be performed on the edge resource node 640. For example, the processing of data that is less urgent or important may be performed by the edge resource node 640, while the processing of data that is of a higher urgency or importance may be performed by the edge gateway devices 620 (depending on, for example, the capabilities of each component, or information in the request indicating urgency or importance). Based on data access, data location or latency, work may continue on edge resource nodes when the processing priorities change during the processing activity. Likewise, configurable systems or hardware resources themselves can be activated (e.g., through a local orchestrator) to provide additional resources to meet the new demand (e.g., adapt the compute resources to the workload data).

The edge resource node(s) 640 also communicate with the core data center 650, which may include compute servers, appliances, and/or other components located in a central location (e.g., a central office of a cellular communication network). The core data center 650 may provide a gateway to the global network cloud 660 (e.g., the Internet) for the edge cloud 110 operations formed by the edge resource node(s) 640 and the edge gateway devices 620. Additionally, in some examples, the core data center 650 may include an amount of processing and storage capabilities and, as such, some processing and/or storage of data for the client compute devices may be performed on the core data center 650 (e.g., processing of low urgency or importance, or high complexity).

The edge gateway nodes 620 or the edge resource nodes 640 may offer the use of stateful applications 632 and a geographic distributed database 634. Although the applications 632 and database 634 are illustrated as being horizontally distributed at a layer of the edge cloud 110, it will be understood that resources, services, or other components of the application may be vertically distributed throughout the edge cloud (including, part of the application executed at the client computing node 610, other parts at the edge gateway nodes 620 or the edge resource nodes 640, etc.). Additionally, as stated previously, there can be peer relationships at any level to meet service objectives and obligations. Further, the data for a specific client or application can move from edge to edge based on changing conditions (e.g., based on acceleration resource availability, following the car movement, etc.). For instance, based on the "rate of decay" of access, prediction can be made to identify the next owner to continue, or when the data or computational access will no longer be viable. These and other services may be utilized to complete the work that is needed to keep the transaction compliant and lossless.

In further scenarios, a container 636 (or pod of containers) may be flexibly migrated from an edge node 620 to other edge nodes (e.g., 620, 640, etc.) such that the container with an application and workload does not need to be reconstituted, re-compiled, re-interpreted in order for migration to work. However, in such settings, there may be some remedial or "swizzling" translation operations applied. For example, the physical hardware at node 640 may differ from edge gateway node 620 and therefore, the hardware abstraction layer (HAL) that makes up the bottom edge of the container will be re-mapped to the physical layer of the target edge node. This may involve some form of late-binding technique, such as binary translation of the HAL from the container native format to the physical hardware format, or may involve mapping interfaces and operations. A pod controller may be used to drive the interface mapping as part of the container lifecycle, which includes migration to/from different hardware environments.

The scenarios encompassed by FIG. 6 may utilize various types of mobile edge nodes, such as an edge node hosted in a vehicle (car/truck/tram/train) or other mobile unit, as the edge node will move to other geographic locations along the platform hosting it. With vehicle-to-vehicle communications, individual vehicles may even act as network edge nodes for other cars, (e.g., to perform caching, reporting, data aggregation, etc.). Thus, it will be understood that the application components provided in various edge nodes may be distributed in static or mobile settings, including coordination between some functions or operations at individual endpoint devices or the edge gateway nodes 620, some others at the edge resource node 640, and others in the core data center 650 or global network cloud 660.

In further configurations, the edge computing system may implement FaaS computing capabilities through the use of respective executable applications and functions. In an example, a developer writes function code (e.g., "computer code" herein) representing one or more computer functions, and the function code is uploaded to a FaaS platform provided by, for example, an edge node or data center. A trigger such as, for example, a service use case or an edge processing event, initiates the execution of the function code with the FaaS platform.

In an example of FaaS, a container is used to provide an environment in which function code (e.g., an application which may be provided by a third party) is executed. The container may be any isolated-execution entity such as a process, a Docker or Kubernetes container, a virtual machine, etc. Within the edge computing system, various datacenter, edge, and endpoint (including mobile) devices are used to "spin up" functions (e.g., activate and/or allocate function actions) that are scaled on demand. The function code gets executed on the physical infrastructure (e.g., edge computing node) device and underlying virtualized containers. Finally, container is "spun down" (e.g., deactivated and/or deallocated) on the infrastructure in response to the execution being completed.

Further aspects of FaaS may enable deployment of edge functions in a service fashion, including a support of respective functions that support edge computing as a service (Edge-as-a-Service or "EaaS"). Additional features of FaaS may include: a granular billing component that enables customers (e.g., computer code developers) to pay only when their code gets executed; common data storage to store data for reuse by one or more functions; orchestration and management among individual functions; function execution management, parallelism, and consolidation; management of container and function memory spaces; coordination of acceleration resources available for functions; and distribution of functions between containers (including "warm" containers, already deployed or operating, versus "cold" which require initialization, deployment, or configuration).

The edge computing system 600 can include or be in communication with an edge provisioning node 644. The edge provisioning node 644 can distribute software such as the example computer readable instructions 882 of FIG. 8, to various receiving parties for implementing any of the methods described herein. The example edge provisioning node 644 may be implemented by any computer server, home server, content delivery network, virtual server, software distribution system, central facility, storage device, storage node, data facility, cloud service, etc., capable of storing and/or transmitting software instructions (e.g., code, scripts, executable binaries, containers, packages, compressed files, and/or derivatives thereof) to other computing devices. Component(s) of the example edge provisioning node 644 may be located in a cloud, in a local area network, in an edge network, in a wide area network, on the Internet, and/or any other location communicatively coupled with the receiving party(ies). The receiving parties may be customers, clients, associates, users, etc. of the entity owning and/or operating the edge provisioning node 644. For example, the entity that owns and/or operates the edge provisioning node 644 may be a developer, a seller, and/or a licensor (or a customer and/or consumer thereof) of software instructions such as the example computer readable instructions 882 of FIG. 8. The receiving parties may be consumers, service providers, users, retailers, OEMs, etc., who purchase and/or license the software instructions for use and/or re-sale and/or sub-licensing.

In an example, edge provisioning node 644 includes one or more servers and one or more storage devices. The storage devices host computer readable instructions such as the example computer readable instructions 882 of FIG. 8, as described below. Similarly to edge gateway devices 620 described above, the one or more servers of the edge provisioning node 644 are in communication with a base station 642 or other network communication entity. In some examples, the one or more servers are responsive to requests to transmit the software instructions to a requesting party as part of a commercial transaction. Payment for the delivery, sale, and/or license of the software instructions may be handled by the one or more servers of the software distribution platform and/or via a third-party payment entity. The servers enable purchasers and/or licensors to download the computer readable instructions 882 from the edge provisioning node 644. For example, the software instructions, which may correspond to the example computer readable instructions 882 of FIG. 8, may be downloaded to the example processor platform/s, which is to execute the computer readable instructions 882 to implement the methods described herein.

In some examples, the processor platform(s) that execute the computer readable instructions 882 can be physically located in different geographic locations, legal jurisdictions, etc. In some examples, one or more servers of the edge provisioning node 644 periodically offer, transmit, and/or force updates to the software instructions (e.g., the example computer readable instructions 882 of FIG. 8) to ensure improvements, patches, updates, etc. are distributed and applied to the software instructions implemented at the end user devices. In some examples, different components of the computer readable instructions 882 can be distributed from different sources and/or to different processor platforms; for example, different libraries, plug-ins, components, and other types of compute modules, whether compiled or interpreted, can be distributed from different sources and/or to different processor platforms. For example, a portion of the software instructions (e.g., a script that is not, in itself, executable) may be distributed from a first source while an interpreter (capable of executing the script) may be distributed from a second source.

Figure 7:
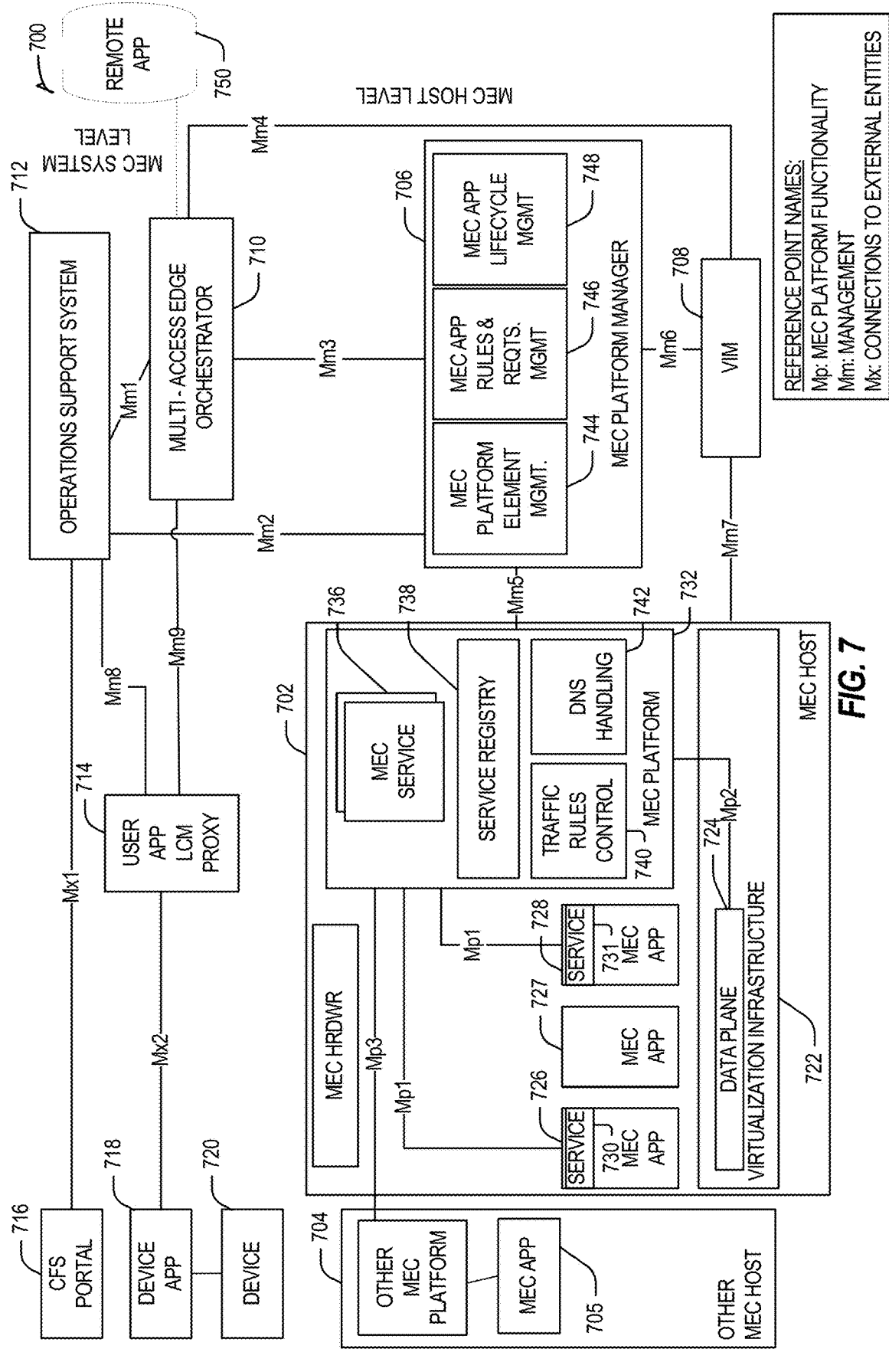
FIG. 7 illustrates an example mobile edge system reference architecture, arranged according to an ETSI Multi-Access Edge Computing (MEC) specification.

FIG. 7 illustrates a mobile edge system reference architecture (or MEC architecture) 700, such as is indicated by ETSI MEC specifications. FIG. 7 specifically illustrates a MEC architecture 700 with MEC hosts 702 and 704 providing functionalities in accordance with the ETSI GS MEC-003 specification. In some aspects, enhancements to the MEC platform 732 and the MEC platform manager 706 may be used for providing specific computing functions within the MEC architecture 700.

Referring to FIG. 7, the MEC network architecture 700 can include MEC hosts 702 and 704, a virtualization infrastructure manager (VIM) 708, an MEC platform manager 706, an MEC orchestrator 710, an operations support system 712, a user app proxy 714, a UE app 718 running on UE 720, and CFS portal 716. The MEC host 702 can include a MEC platform 732 with filtering rules control component 740, a DNS handling component 742, a service registry 738, and MEC services 736. The MEC services 736 can include at least one scheduler, which can be used to select resources for instantiating MEC apps (or NFVs) 726, 727, and 728 upon virtualization infrastructure 722. The MEC apps 726 and 728 can be configured to provide services 730 and 731, which can include processing network communications traffic of different types associated with one or more wireless connections (e.g., connections to one or more RAN (e.g., O-RAN) or telecom-core network entities). The MEC app 705 instantiated within MEC host 704 can be similar to the MEC apps 726-7728 instantiated within MEC host 702. The virtualization infrastructure 722 includes a data plane 724 coupled to the MEC platform via an MP2 interface. Additional interfaces between various network entities of the MEC architecture 700 are illustrated in FIG. 7.

The MEC platform manager 706 can include MEC platform element management component 744, MEC app rules and requirements management component 746, and MEC app lifecycle management component 748. The various entities within the MEC architecture 700 can perform functionalities as disclosed by the ETSI GS MEC-003 specification. In some aspects, the remote application (or app) 750 is configured to communicate with the MEC host 702 (e.g., with the MEC apps 726-7728) via the MEC orchestrator 710 and the MEC platform manager 706.

D. Computing Architectures and Systems

In further examples, any of the computing nodes or devices discussed with reference to the present edge computing systems and environment may be fulfilled based on the components depicted in FIG. 8. Respective edge computing nodes may be embodied as a type of device, appliance, computer, or other "thing" capable of communicating with other edge, networking, or endpoint components. For example, an edge compute device may be embodied as a personal computer, server, smartphone, a mobile compute device, a smart appliance, an in-vehicle compute system (e.g., a navigation system), a self-contained device having an outer case, shell, etc., or other device or system capable of performing the described functions.

Figure 8:
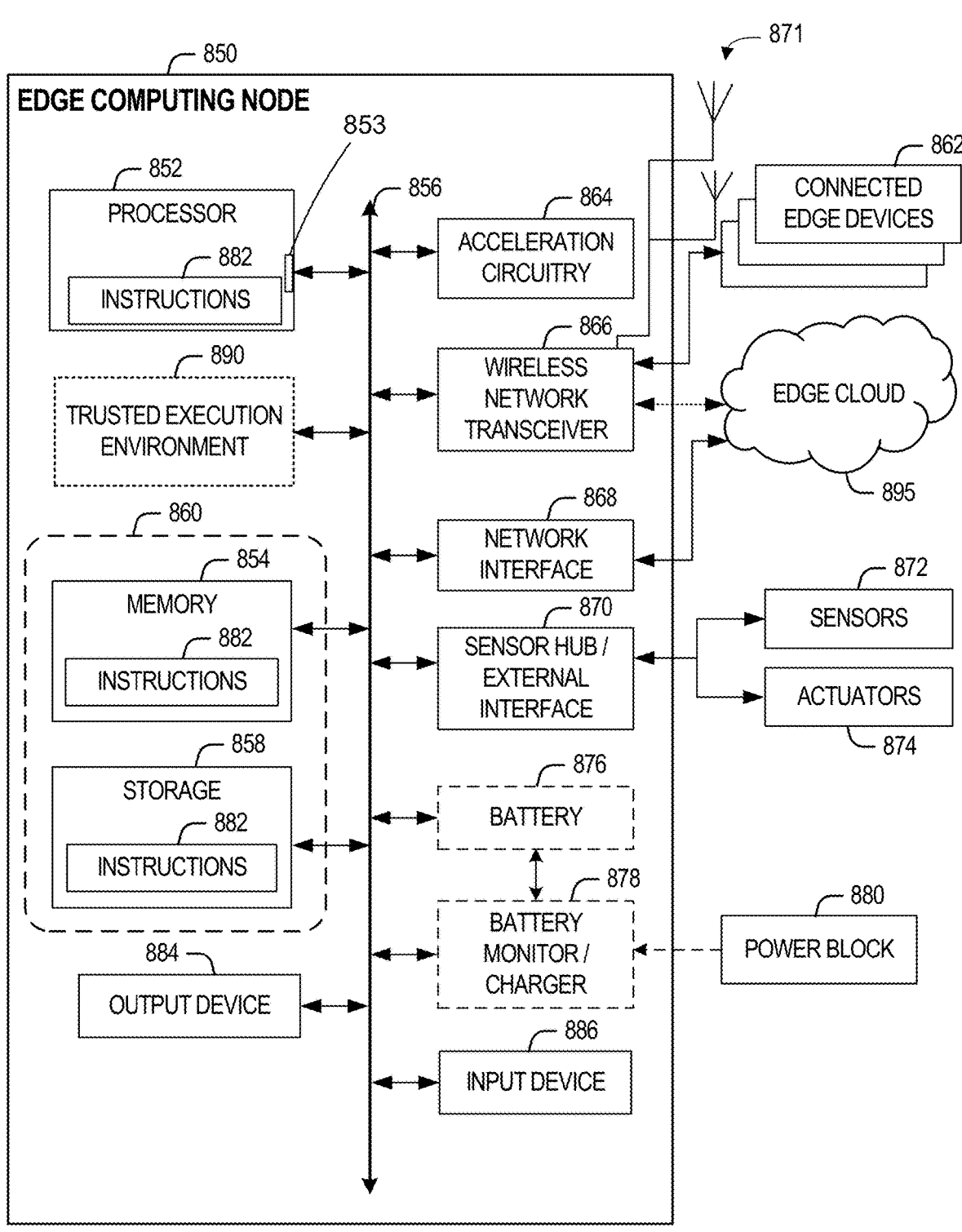
FIG. 8 provides a further overview of example components within a computing device in an edge computing system.

In a more detailed example, FIG. 8 illustrates a block diagram of an example of components that may be present in an edge computing node 850 for implementing the techniques (e.g., operations, processes, methods, and methodologies) described herein. The edge computing node 850 may include any combinations of the hardware or logical components referenced herein, and it may include or couple with any device usable with an edge communication network or a combination of such networks. The components may be implemented as integrated circuits (ICs), portions thereof, discrete electronic devices, or other modules, instruction sets, programmable logic or algorithms, hardware, hardware accelerators, software, firmware, or a combination thereof adapted in the edge computing node 850, or as components otherwise incorporated within a chassis of a larger system.

The edge computing device 850 may include processing circuitry in the form of a processor 852, which may be a microprocessor, a multi-core processor, a multithreaded processor, an ultra-low voltage processor, an embedded processor, an xPU/DPU/IPU/NPU, special purpose processing unit, specialized processing unit, or other known processing elements. The processor 852 may be a part of a system on a chip (SoC) in which the processor 852 and other components are formed into a single integrated circuit, or a single package, such as the Edison™ or Galileo™ SoC boards from Intel Corporation, Santa Clara, California As an example, the processor 852 may include an Intel® Architecture Core™ based CPU processor, such as a Quark™, an Atom™, an i3, an i5, an i7, an i9, or an MCU-class processor, or another such processor available from Intel®. However, any number other processors may be used, such as available from Advanced Micro Devices, Inc. (AMD®) of Sunnyvale, California, a MIPS®-based design from MIPS Technologies, Inc. of Sunnyvale, California, an ARM®-based design licensed from ARM Holdings, Ltd. or a customer thereof, or their licensees or adopters. The processors may include units such as an A5-13 processor from Apple® Inc., a Snapdragon™ processor from Qualcomm® Technologies, Inc., or an OMAP™ processor from Texas Instruments, Inc. The processor 852 and accompanying circuitry may be provided in a single socket form factor, multiple socket form factor, or a variety of other formats, including in limited hardware configurations or configurations that include fewer than all elements shown in FIG. 8.

The processor 852 may communicate with a system memory 854 over an interconnect 856 (e.g., a bus) through an interconnect interface 853 of the processor. The interconnect interface 853 may include any input/output connection of the processor 852 that allows the processor 852 to be connected through interconnect 856 to other components of the edge computing node 850. The processor 852 may include one or more processors and/or any type of processing circuitry. Any number of memory devices may be used to provide for a given amount of system memory. As examples, the memory 754 may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples, the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or Mini-DIMMs.

To provide for persistent storage of information such as data, applications, operating systems and so forth, a storage 858 may also couple to the processor 852 via the interconnect 856. In an example, the storage 858 may be implemented via a solid-state disk drive (SSDD). Other devices that may be used for the storage 858 include flash memory cards, such as Secure Digital (SD) cards, microSD cards, eXtreme Digital (XD) picture cards, and the like, and Universal Serial Bus (USB) flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 858 may be on-die memory or registers associated with the processor 852. However, in some examples, the storage 858 may be implemented using a micro hard disk drive (HDD). Further, any number of new technologies may be used for the storage 858 in addition to, or instead of, the technologies described, such resistance change memories, phase change memories, holographic memories, or chemical memories, among others.

The components may communicate over the interconnect 856. The interconnect 856 may include any number of technologies, including industry standard architecture (ISA), extended ISA (EISA), peripheral component interconnect (PCI), peripheral component interconnect extended (PCIx), PCI express (PCIe), or any number of other technologies. The interconnect 856 may be a proprietary bus, for example, used in an SoC based system. Other bus systems may be included, such as an Inter-Integrated Circuit (I2C) interface, a Serial Peripheral Interface (SPI) interface, point to point interfaces, and a power bus, among others.

The interconnect 856 may couple the processor 852 to a transceiver 866, for communications with the connected edge devices 862. The transceiver 866 may be coupled to one or more antennas 871 of the edge computing node 850 to enable the edge computing node to wirelessly communicate with other edge computing nodes or other nodes in the wireless edge network. The transceiver 866 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 862. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 866 (or multiple transceivers) may communicate using multiple standards or radios for communications at a different range. For example, the edge computing node 850 may communicate with close devices, e.g., within about 10 meters, using a local transceiver based on Bluetooth Low Energy (BLE), or another low power radio, to save power. More distant connected edge devices 862, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 866 (e.g., a radio transceiver) may be included to communicate with devices or services in a cloud (e.g., an edge cloud 895) via local or wide area network protocols. The wireless network transceiver 866 may be a low-power wide-area (LPWA) transceiver that follows the IEEE 802.15.4, or IEEE 802.15.4g standards, among others. The edge computing node 850 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 866, as described herein. For example, the transceiver 866 may include a cellular transceiver that uses spread spectrum (SPA/SAS) communications for implementing high-speed communications. Further, any number of other protocols may be used, such as Wi-Fi® networks for medium speed communications and provision of network communications. The transceiver 866 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 868 may be included to provide a wired communication to nodes of the edge cloud 895 or to other devices, such as the connected edge devices 862 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 868 may be included to enable connecting to a second network, for example, a first NIC 868 providing communications to the cloud over Ethernet, and a second NIC 868 providing communications to other devices over another type of network.

Given the variety of types of applicable communications from the device to another component or network, applicable communications circuitry used by the device may include or be embodied by any one or more of components 864, 866, 868, or 870. Accordingly, in various examples, applicable means for communicating (e.g., receiving, transmitting, etc.) may be embodied by such communications circuitry.

The edge computing node 850 may include or be coupled to acceleration circuitry 864, which may be embodied by one or more artificial intelligence (AI) accelerators, a neural compute stick, neuromorphic hardware, an FPGA, an arrangement of GPUs, an arrangement of xPUs/DPUs/IPU/NPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. These tasks also may include the specific edge computing tasks for service management and service operations discussed elsewhere in this document.

The interconnect 856 may couple the processor 852 to a sensor hub or external interface 870 that is used to connect additional devices or subsystems. The devices may include sensors 872, such as accelerometers, level sensors, flow sensors, optical light sensors, camera sensors, temperature sensors, global navigation system (e.g., GPS) sensors, pressure sensors, barometric pressure sensors, and the like. The hub or interface 870 further may be used to connect the edge computing node 850 to actuators 874, such as power switches, valve actuators, an audible sound generator, a visual warning device, and the like.

In some optional examples, various input/output (I/O) devices may be present within or connected to, the edge computing node 850. For example, a display or other output device 884 may be included to show information, such as sensor readings or actuator position. An input device 886, such as a touch screen or keypad may be included to accept input. An output device 884 may include any number of forms of audio or visual display, including simple visual outputs such as binary status indicators (e.g., light-emitting diodes (LEDs)) and multi-character visual outputs, or more complex outputs such as display screens (e.g., liquid crystal display (LCD) screens), with the output of characters, graphics, multimedia objects, and the like being generated or produced from the operation of the edge computing node 850. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 876 may power the edge computing node 850, although, in examples in which the edge computing node 850 is mounted in a fixed location, it may have a power supply coupled to an electrical grid, or the battery may be used as a backup or for temporary capabilities. The battery 876 may be a lithium ion battery, or a metal-air battery, such as a zinc-air battery, an aluminum-air battery, a lithium-air battery, and the like.

A battery monitor/charger 878 may be included in the edge computing node 850 to track the state of charge (SoCh) of the battery 876, if included. The battery monitor/charger 878 may be used to monitor other parameters of the battery 876 to provide failure predictions, such as the state of health (SoH) and the state of function (SoF) of the battery 876. The battery monitor/charger 878 may include a battery monitoring integrated circuit, such as an LTC4020 or an LT7990 from Linear Technologies, an ADT7488A from ON Semiconductor of Phoenix Arizona, or an IC from the UCD90xxx family from Texas Instruments of Dallas, TX. The battery monitor/charger 878 may communicate the information on the battery 876 to the processor 852 over the interconnect 856. The battery monitor/charger 878 may also include an analog-to-digital (ADC) converter that enables the processor 852 to directly monitor the voltage of the battery 876 or the current flow from the battery 876. The battery parameters may be used to determine actions that the edge computing node 850 may perform, such as transmission frequency, mesh network operation, sensing frequency, and the like.

A power block 880, or other power supply coupled to a grid, may be coupled with the battery monitor/charger 878 to charge the battery 876. In some examples, the power block 880 may be replaced with a wireless power receiver to obtain the power wirelessly, for example, through a loop antenna in the edge computing node 850. A wireless battery charging circuit, such as an LTC4020 chip from Linear Technologies of Milpitas, California, among others, may be included in the battery monitor/charger 878. The specific charging circuits may be selected based on the size of the battery 876, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 858 may include instructions 882 in the form of software, firmware, or hardware commands to implement the techniques described herein. Although such instructions 882 are shown as code blocks included in the memory 854 and the storage 858, it may be understood that any of the code blocks may be replaced with hardwired circuits, for example, built into an application specific integrated circuit (ASIC).

In an example, the instructions 882 provided via the memory 854, the storage 858, or the processor 852 may be embodied as a non-transitory, machine-readable medium 860 including code to direct the processor 852 to perform electronic operations in the edge computing node 850. The processor 852 may access the non-transitory, machine-readable medium 860 over the interconnect 856. For instance, the non-transitory, machine-readable medium 860 may be embodied by devices described for the storage 858 or may include specific storage units such as optical disks, flash drives, or any number of other hardware devices. The non-transitory, machine-readable medium 860 may include instructions to direct the processor 852 to perform a specific sequence or flow of actions, for example, as described with respect to the flowchart(s) and block diagram(s) of operations and functionality depicted above. As used herein, the terms "machine-readable medium" and "computer-readable medium" are interchangeable.

Also in a specific example, the instructions 882 on the processor 852 (separately, or in combination with the instructions 882 of the machine readable medium 860) may configure execution or operation of a trusted execution environment (TEE) 890. In an example, the TEE 890 operates as a protected area accessible to the processor 852 for secure execution of instructions and secure access to data. Various implementations of the TEE 890, and an accompanying secure area in the processor 852 or the memory 854 may be provided, for instance, through use of Intel® Software Guard Extensions (SGX) or ARM® TrustZone® hardware security extensions, Intel® Management Engine (ME), or Intel® Converged Security Manageability Engine (CSME). Other aspects of security hardening, hardware roots-of-trust, and trusted or protected operations may be implemented in the device 850 through the TEE 890 and the processor 852.

E. Machine Readable Medium and Distributed Software Instructions

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., Hypertext Transfer Protocol (HTTP)).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

Figure 9:
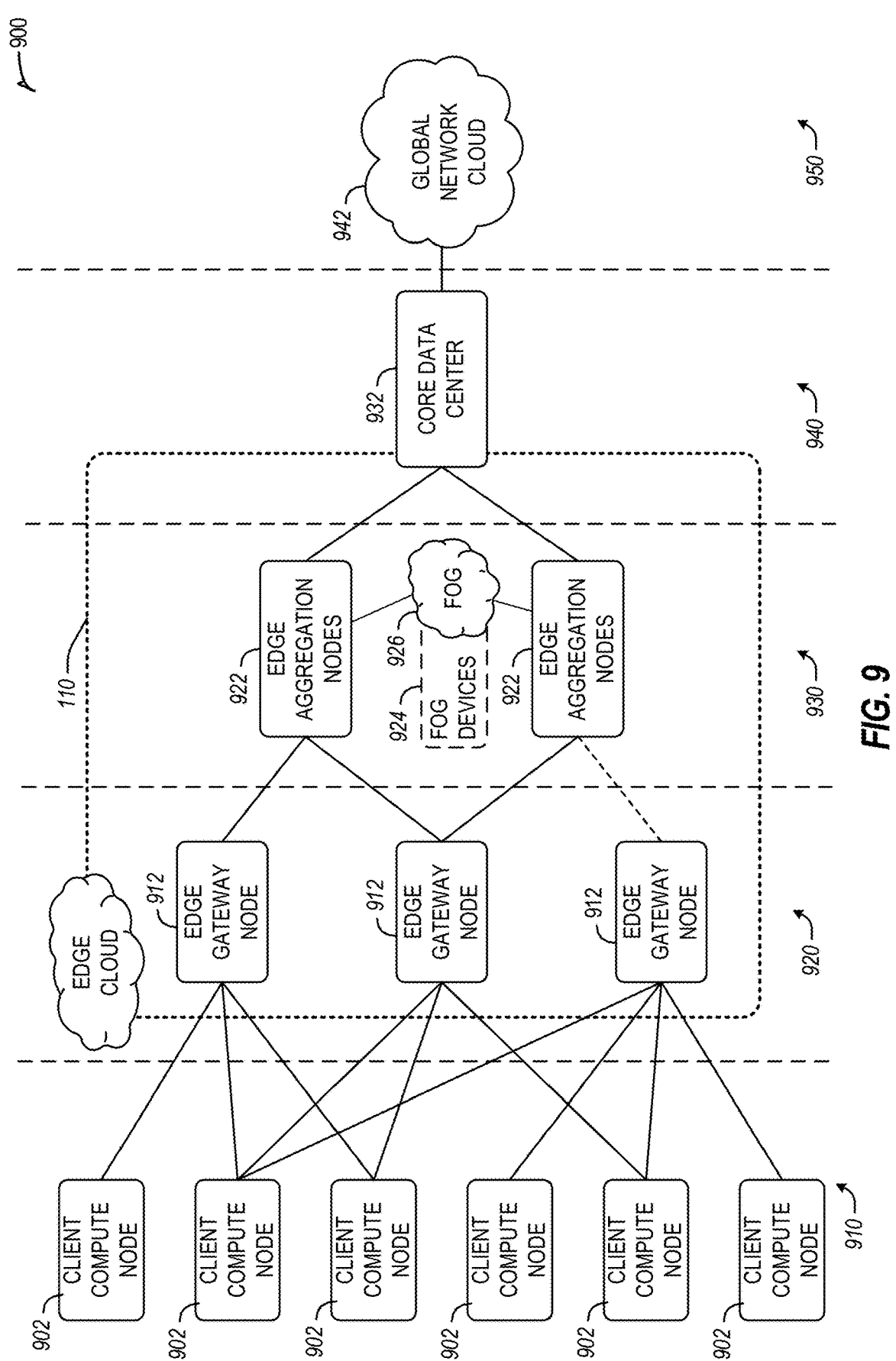
FIG. 9 illustrates an overview of layers of distributed compute deployed among an edge computing system, according to an example.

At a more generic level, an edge computing system may be described to encompass any number of deployments operating in an edge cloud 110, which provide coordination from client and distributed computing devices. FIG. 9 provides a further abstracted overview of layers of distributed compute deployed among an edge computing environment for purposes of illustration.

FIG. 9 generically depicts an edge computing system for providing edge services and applications to multi-stakeholder entities, as distributed among one or more client computing nodes 902, one or more edge gateway nodes 912, one or more edge aggregation nodes 922, one or more core data centers 932, and a global network cloud 942, as distributed across layers of the network. The implementation of the edge computing system may be provided at or on behalf of a telecommunication service provider ("telco", or "TSP"), internet-of-things service provider, cloud service provider (CSP), enterprise entity, or any other number of entities.

Each node or device of the edge computing system is located at a particular layer corresponding to layers 910, 920, 930, 940, 950. For example, the client computing nodes 902 are each located at an endpoint layer 910, while each of the edge gateway nodes 912 are located at an edge devices layer 920 (local level) of the edge computing system. Additionally, each of the edge aggregation nodes 922 (and/or fog devices 924, if arranged or operated with or among a fog networking configuration 926) are located at a network access layer 930 (an intermediate level). Fog computing (or "fogging") generally refers to extensions of cloud computing to the edge of an enterprise's network, typically in a coordinated distributed or multi-node network. Some forms of fog computing provide the deployment of compute, storage, and networking services between end devices and cloud computing data centers, on behalf of the cloud computing locations. Such forms of fog computing provide operations that are consistent with edge computing as discussed herein; many of the edge computing aspects discussed herein are applicable to fog networks, fogging, and fog configurations. Further, aspects of the edge computing systems discussed herein may be configured as a fog, or aspects of a fog may be integrated into an edge computing architecture.

The core data center 932 is located at a core network layer 940 (e.g., a regional or geographically-central level), while the global network cloud 942 is located at a cloud data center layer 950 (e.g., a national or global layer). The use of "core" is provided as a term for a centralized network location—deeper in the network—which is accessible by multiple edge nodes or components; however, a "core" does not necessarily designate the "center" or the deepest location of the network. Accordingly, the core data center 932 may be located within, at, or near the edge cloud 110.

Although an illustrative number of client computing nodes 902, edge gateway nodes 912, edge aggregation nodes 922, core data centers 932, global network clouds 942 are shown in FIG. 9, it should be appreciated that the edge computing system may include more or fewer devices or systems at each layer. Additionally, as shown in FIG. 9, the number of components of each layer 910, 920, 930, 940, 950 generally increases at each lower level (i.e., when moving closer to endpoints). As such, one edge gateway node 912 may service multiple client computing nodes 902, and one edge aggregation node 922 may service multiple edge gateway nodes 912.

Consistent with the examples provided herein, each client computing node 902 may be embodied as any type of end point component, device, appliance, or "thing" capable of communicating as a producer or consumer of data. Further, the label "node" or "device" as used in the edge computing system 900 does not necessarily mean that such node or device operates in a client or agent/minion/follower role; rather, any of the nodes or devices in the edge computing system 900 refer to individual entities, nodes, or subsystems which include discrete or connected hardware or software configurations to facilitate or use the edge cloud 110.

As such, the edge cloud 110 is formed from network components and functional features operated by and within the edge gateway nodes 912 and the edge aggregation nodes 922 of layers 920, 930, respectively. The edge cloud 110 may be embodied as any type of network that provides edge computing and/or storage resources which are proximately located to radio access network (RAN) capable endpoint devices (e.g., mobile computing devices, IoT devices, smart devices, etc., which may be compatible with O-RAN specifications), which are shown in FIG. 9 as the client computing nodes 902. In other words, the edge cloud 110 may be envisioned as an "edge" which connects the endpoint devices and traditional mobile network access points that serves as an ingress point into service provider core networks, including carrier networks (e.g., Global System for Mobile Communications (GSM) networks, Long-Term Evolution (LTE) networks, 5G networks, etc.), while also providing storage and/or compute capabilities. Other types and forms of network access (e.g., Wi-Fi, long-range wireless networks) may also be utilized in place of or in combination with such 3GPP carrier networks.

In some examples, the edge cloud 110 may form a portion of or otherwise provide an ingress point into or across a fog networking configuration 926 (e.g., a network of fog devices 924, not shown in detail), which may be embodied as a system-level horizontal and distributed architecture that distributes resources and services to perform a specific function. For instance, a coordinated and distributed network of fog devices 924 may perform computing, storage, control, or networking aspects in the context of an IoT system arrangement. Other networked, aggregated, and distributed functions may exist in the edge cloud 110 between the cloud data center layer 950 and the client endpoints (e.g., client computing nodes 902). Some of these are discussed in the following sections in the context of network functions or service virtualization, including the use of virtual edges and virtual services which are orchestrated for multiple stakeholders.

The edge gateway nodes 912 and the edge aggregation nodes 922 cooperate to provide various edge services and security to the client computing nodes 902. Furthermore, because each client computing node 902 may be stationary or mobile, each edge gateway node 912 may cooperate with other edge gateway devices to propagate presently provided edge services and security as the corresponding client computing node 902 moves about a region. To do so, each of the edge gateway nodes 912 and/or edge aggregation nodes 922 may support multiple tenancy and multiple stakeholder configurations, in which services from (or hosted for) multiple service providers and multiple consumers may be supported and coordinated across a single or multiple compute devices.

F. Use Case: Satellite Edge Connectivity

Figure 10:
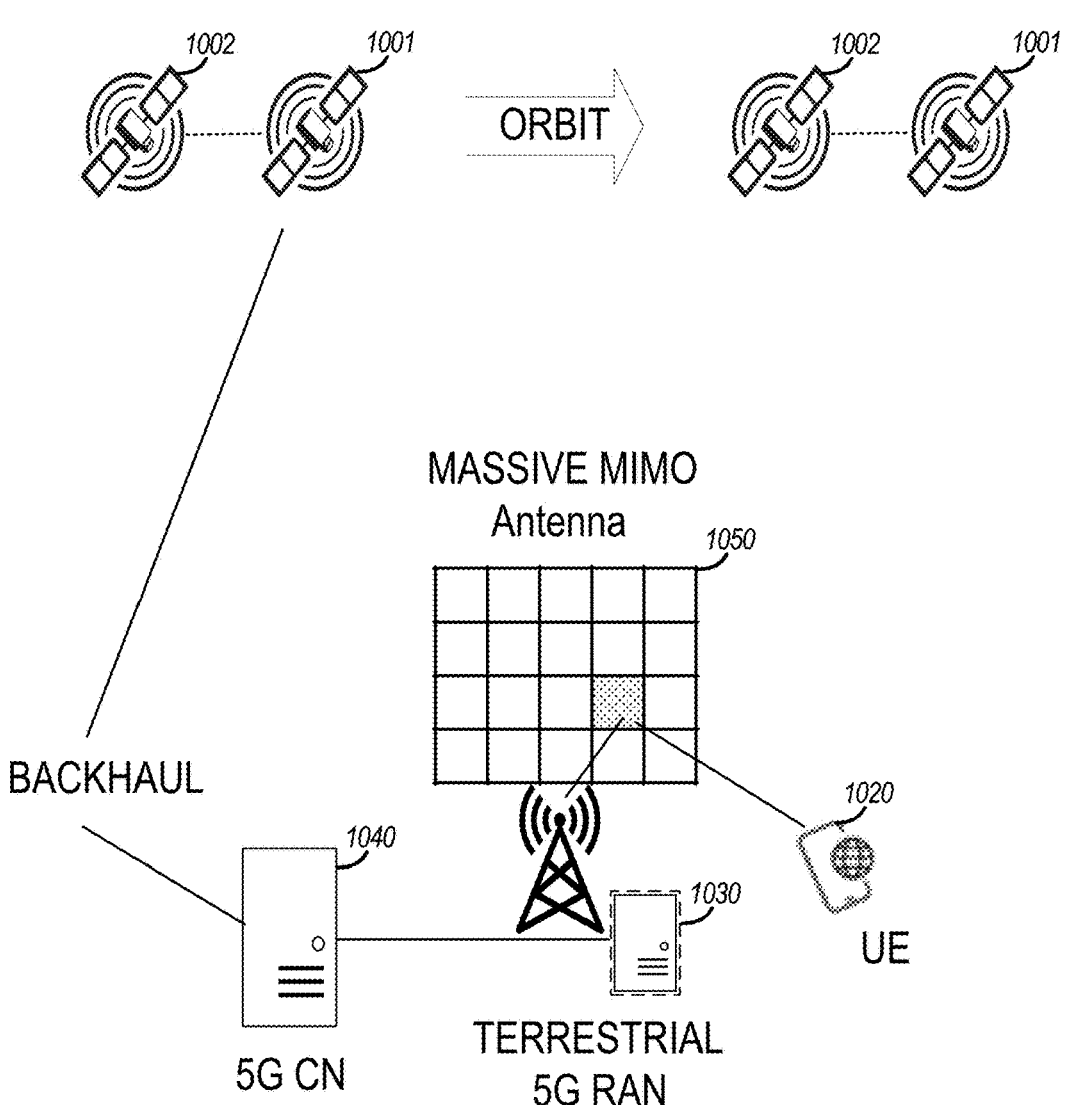
FIG. 10 illustrates network connectivity in non-terrestrial (satellite) and terrestrial (mobile cellular network) settings, according to an example.

FIG. 10 illustrates network connectivity in non-terrestrial (satellite) and terrestrial (mobile cellular network) settings, according to an example. As shown, a satellite constellation may include multiple satellites 1001, 1002, which are connected to each other and to one or more terrestrial networks. Specifically, the satellite constellation is connected to a backhaul network, which is in turn connected to a 5G core network 1040. The 5G core network is used to support 5G communication operations at the satellite network and at a terrestrial 5G radio access network (RAN) 1030. The RAN may be compatible with O-RAN specifications, in certain embodiments.

FIG. 10 also depicts the use of the terrestrial 5G RAN 1030, to provide radio connectivity to a user equipment (UE) 1020 via a massive MIMO antenna 1050. It will be understood that a variety of network communication components and units are not depicted in FIG. 10 for purposes of simplicity. With these basic entities in mind, the following techniques describe ways in which terrestrial and satellite networks can be extended for various edge computing scenarios.

Figure 11:
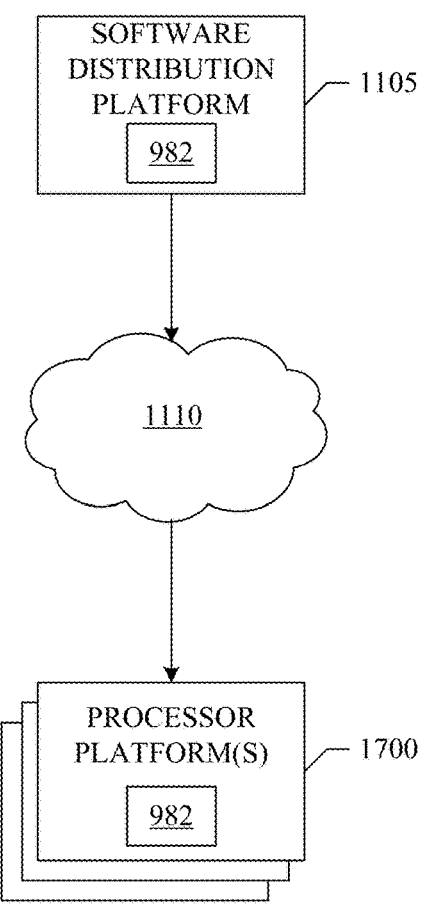
FIG. 11 illustrates an example software distribution platform to distribute software, such as the example computer-readable instructions FIG. 8, to one or more devices.

G. Software Distribution:

FIG. 11 illustrates an example software distribution platform 1105 to distribute software, such as the example computer readable instructions 882 of FIG. 8, to one or more devices, such as example processor platform(s) 1100 and/or example connected edge devices 862. The example software distribution platform 1105 may be implemented by any computer server, data facility, cloud service, etc., capable of storing and transmitting software to other computing devices (e.g., third parties, the example connected edge devices 862 of FIG. 8). Example connected edge devices may be customers, clients, managing devices (e.g., servers), third parties (e.g., customers of an entity owning and/or operating the software distribution platform 1105). Example connected edge devices may operate in commercial and/or home automation environments. In some examples, a third party is a developer, a seller, and/or a licensor of software such as the example computer readable instructions 882 of FIG. 8. The third parties may be consumers, users, retailers, OEMs, etc. that purchase and/or license the software for use and/or re-sale and/or sub-licensing. In some examples, distributed software causes display of one or more user interfaces (UIs) and/or graphical user interfaces (GUIs) to identify the one or more devices (e.g., connected edge devices) geographically and/or logically separated from each other (e.g., physically separated IoT devices chartered with the responsibility of water distribution control (e.g., pumps), electricity distribution control (e.g., relays), etc.).

In the illustrated example of FIG. 11, the software distribution platform 1105 includes one or more servers and one or more storage devices. The storage devices store the computer readable instructions 882. The one or more servers of the example software distribution platform 1105 are in communication with a network 1110, which may correspond to any one or more of the Internet and/or any of the example networks described above. In some examples, the one or more servers are responsive to requests to transmit the software to a requesting party as part of a commercial transaction. Payment for the delivery, sale and/or license of the software may be handled by the one or more servers of the software distribution platform and/or via a third-party payment entity. The servers enable purchasers and/or licensors to download the computer readable instructions 882 from the software distribution platform 1105. For example, the software, which may correspond to the example computer readable instructions 882 of FIG. 8, may be downloaded to the example processor platform(s) 1100 (e.g., example connected edge devices), which is/are to execute the computer readable instructions 882 to implement the software instructions. In some examples, one or more servers of the software distribution platform 1105 are communicatively connected to one or more security domains and/or security devices through which requests and transmissions of the example computer readable instructions 882 must pass. In some examples, one or more servers of the software distribution platform 1105 periodically offer, transmit, and/or force updates to the software (e.g., the example computer readable instructions 882 of FIG. 8) to ensure improvements, patches, updates, etc. are distributed and applied to the software at the end user devices.

In the illustrated example of FIG. 11, the computer readable instructions 882 are stored on storage devices of the software distribution platform 1105 in a particular format. A format of computer readable instructions includes, but is not limited to a particular code language (e.g., Java, JavaScript, Python, C, C#, SQL, HTML, etc.), and/or a particular code state (e.g., uncompiled code (e.g., ASCII), interpreted code, linked code, executable code (e.g., a binary), etc.). In some examples, the computer readable instructions 882 stored in the software distribution platform 1105 are in a first format when transmitted to the example processor platform(s) 1100. In some examples, the first format is an executable binary in which particular types of the processor platform(s) 1100 can execute. However, in some examples, the first format is uncompiled code that requires one or more preparation tasks to transform the first format to a second format to enable execution on the example processor platform(s) 1100. For instance, the receiving processor platform(s) 1100 may need to compile the computer readable instructions 882 in the first format to generate executable code in a second format that is capable of being executed on the processor platform(s) 1100. In still other examples, the first format is interpreted code that, upon reaching the processor platform(s) 1100, is interpreted by an interpreter to facilitate execution of instructions.

H. Source Degradation Detection and Auto-Tuning of Cameras

Figure 12:
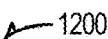
FIG. 12 depicts one embodiment of a system for monitoring an environment.
Figure 12:
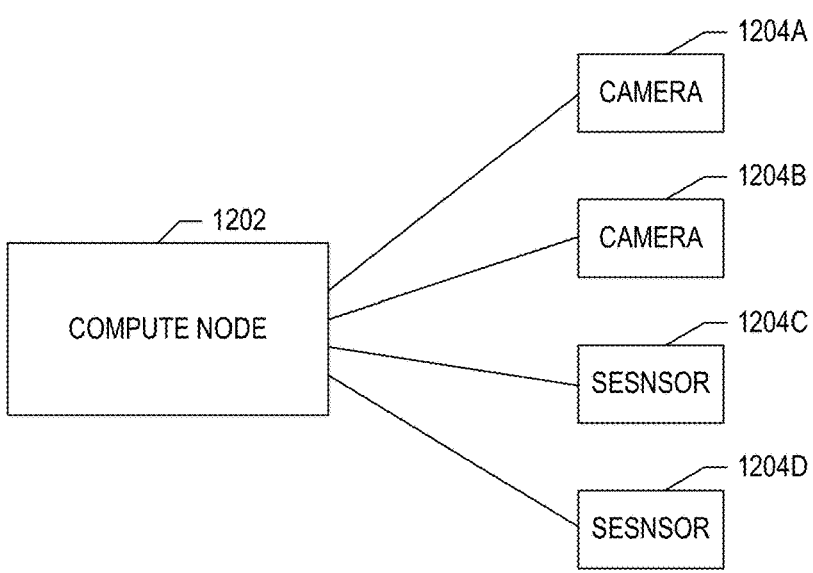

Referring now to FIG. 12, in one embodiment, a system 1200 for monitoring a physical environment includes a compute node 1202 and one or more cameras 1204 or other sensors 1204, such as cameras 1204A-1204B and sensors 1204C-1204D. In use and as described in more detail below, cameras 1204A-1204B and sensors 1204C-1204D may be used to monitor a physical environment, such as parts of a manufacturing facility, industrial retail, hospitality facility, health care facility, etc. For example, the compute node 1202 may process images from the cameras 1204A-1204B to check whether one or more steps of a manufacturing process is performed correctly. The sensors 1202 may be any suitable kind of sensor, such as a camera, motion sensor a microphone, an optical sensor such as a ultraviolet or infrared sensor, a vibration sensor, a temperature sensor etc. The system 1200 may include any suitable number of sensors or combinations of different sensors.

In the illustrative embodiment, a machine-learning-based algorithm is used to determine whether there is an error in a step of the manufacturing process. The machine-learning-based algorithm may provide an inference confidence value indicating how confident the algorithm is that an error is or is not present. A system integrator may use the compute node 1202 to adjust parameters of the cameras 1204A-1204D and/or parameters of the algorithm to improve performance of the algorithm. The system integrator may be embodied as one or more persons that install, monitor, and/or administer the system 1200, compute node 1202, and sensors 1204. As described in more detail below, a component of the compute node 1202 may monitor the actions of the system integrator and apply another machine-learning-based algorithm that can be used to learn how to improve performance of the algorithm under a variety of conditions.

In a production environment, after the system integrator has performed the initial configuration, the environment may change, affecting the quality of images from the camera and/or the quality of inference results of an analysis algorithm. For example, lighting (whether ambient or artificially added lights) may change, dust may be on the lens, etc. The compute node 1202 may adjust parameters of the camera and/or the machine-learning-based algorithm to improve the quality of images from the camera and/or the quality of inference results based on a model developed while monitoring the system integrator.

The compute node 1202 may be any suitable compute node described herein, such as an edge computing node 850. The sensors 1204 may be embodied as sensors 872. The compute node 1202 may be embodied as a server computer, a desktop computer, a mobile computer, a laptop, a cell phone, etc. In some embodiments, the compute node 1202 may be embodied as several devices that are spatially separated, such as devices that communicate over a network. For example, in one embodiment, one compute node 1202 may monitor the system integrator and learn a statistical model for a camera, and another compute note may monitor the inference results and adjust parameters of the camera 1204 accordingly. In some embodiments, the compute node 1202 may be embodied as, e.g. industrial or business equipment 163 or sensors and IoT devices 167 connected to a data center cloud 130 in the system 100 in FIG. 1. Data from the cameras 1204 or other sensors may embodied as or transfer data through any layer operating in the edge cloud 110, such as network layers 200-240 in FIG. 2. The compute node 1202 may be positioned as various client endpoints 310, an on-premise network system 332, at a data center 360, etc., shown in FIG. 3. The compute device 1202 may be embodied as or include various container pods, tenants, edge nodes, etc., as shown in FIG. 4

The cameras 1204A-1204D may be any suitable camera, such as a CCD-based camera, a CMOS-based camera, etc. The cameras 1204A-1204D may have parameters that can be adjusted, such as exposure time, focus, white balance, contrast, etc. The cameras 1204A-1204D may be connected directly to the compute node 1202 (e.g., through USB), and/or the cameras 1204A-1204D may be connected to the compute node 1202 through a network.

Figure 13:
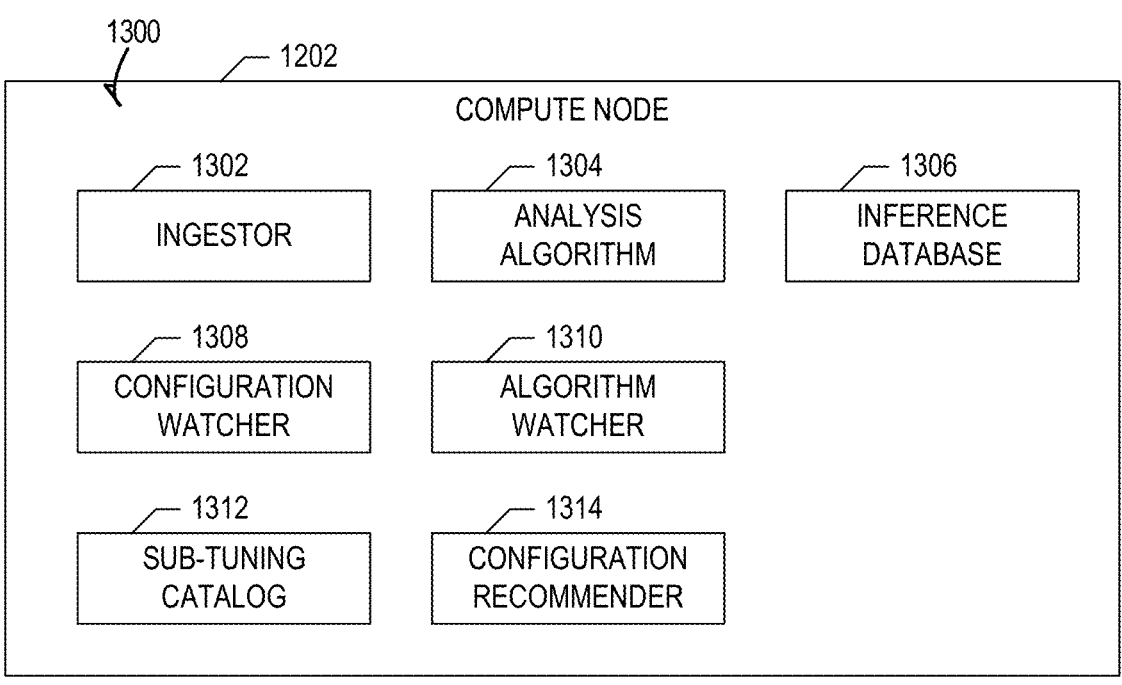
FIG. 13 is a simplified block diagram of at least one embodiment of an environment that may be established by a compute node of FIG. 12.

Referring now to FIG. 13, in an illustrative embodiment, the compute node 1202 establishes an environment 1300 during operation. The illustrative environment 1300 includes an ingestor 1302, an analysis algorithm 1304, an inference database 1306, a configuration watcher 1308, an algorithm watcher 1310, a sub-tuning catalog 1312, and a configuration recommender 1314. The various modules of the environment 1300 may be embodied as hardware, software, firmware, or a combination thereof. For example, the various modules, logic, and other components of the environment 1300 may form a portion of, or otherwise be established by, the processor 852, the machine-readable medium 860, or other hardware components of the compute node 1202. As such, in some embodiments, one or more of the modules of the environment 1300 may be embodied as circuitry or collection of electrical devices (e.g., ingestor circuitry 1302, analysis algorithm circuitry 1304, configuration watcher circuitry 1308, etc.). It should be appreciated that, in such embodiments, one or more of the circuits (e.g., the ingestor circuitry 1302, the analysis algorithm circuitry 1304, the configuration watcher circuitry 1308, etc.) may form a portion of one or more of the processor 852, the interconnect 856, the machine-readable medium 860, and/or other components of the compute node 1202. For example, in some embodiments, some or all of the modules may be embodied as the processor 852 as well as the machine-readable medium 860 storing instructions to be executed by the processor 852. Additionally, in some embodiments, one or more of the illustrative modules may form a portion of another module and/or one or more of the illustrative modules may be independent of one another. Further, in some embodiments, one or more of the modules of the environment 1300 may be embodied as virtualized hardware components or emulated architecture, which may be established and maintained by the processor 852 or other components of the compute node 1202. It should be appreciated that some of the functionality of one or more of the modules of the environment 1300 may require a hardware implementation, in which case embodiments of modules that implement such functionality will be embodied at least partially as hardware.

The ingestor 1302, which may be embodied as hardware, firmware, software, virtualized hardware, emulated architecture, and/or a combination thereof, as discussed above, is configured to receive images from the camera 1204 or other sensors 1204. The ingestor 1302 may pre-process images, such as by cropping, rotating, resizing, adjusting a color palette, etc. In some embodiments, the ingestor 1302 receive and synthesize information from multiple sensors 1204, such as cameras, microphones, temperature sensors, lighting sensors, etc. The ingestor 1302 can then stream images to the analysis algorithm 1304 to perform analysis on the images as well as to the configuration watcher 1308 to monitor configuration of the camera and the analysis algorithm 1304. The stream to the configuration watcher 1308 may include camera setting metadata, such as zoom, white balance, contrast, gain, the camera model, resolution, dynamic behavior, and other information about the camera 1204.

The analysis algorithm 1304 is configured to perform image processing on images from the camera 1204 and/or processing on other sensor data from sensors 1204 to determine one or more key performance indicators (KPIs), such as whether a particular step of a manufacturing process has been performed correctly. The analysis algorithm 1304 may use a machine-learning-based algorithm that is trained on labeled or unlabeled training data. A system integrator may adjust parameters of the analysis algorithm 1304 to improve performance of the analysis algorithm 1304.

The inference database 1306 is configured to store inference results from the analysis algorithm 1304. The inference database 1306 may store images from the camera 1204 as well as sensor data from other sensors 1204. Images and inference results stored in the inference database 1306 may be used by a system integrator or the configuration recommender 1314 to improve performance of the analysis algorithm 1304.

The configuration watcher 1308 is configured to learn the sub-tuning actions for improving performance of the camera 1204, other sensors 1204, and/or the analysis algorithm 1304. The configuration watcher 1308 may monitor actions of a system integrator as the system integrator adjusts various parameters of the camera 1204 and/or the analysis algorithm 1304. The configuration watcher 1308 may use a machine-learning-based algorithm to learn how the system integrator adjusts various parameters of the camera 1204 and/or the analysis algorithm 1304. The configuration watcher 1308 may build up a statistical model for the camera 1204 and/or the analysis algorithm 1304. The configuration watcher 1308 may send sub-tuning actions (such as changing camera parameters) to the sub-tuning catalog 1312. In use, in a production environment, the configuration watcher 1308 will continue to monitor configuration of the camera 1204 and/or the analysis algorithm 1304. The configuration watcher 1308 may update the model for the camera 1204 and/or the analysis algorithm 1304 and share updates with the sub-tuning catalog 1312. In operation, in a production environment, the configuration watcher 1308 may continue to monitor configuration of the camera 1204 and/or the analysis algorithm 1304 and update models for the camera 1204 and/or the analysis algorithm 1304 accordingly.

The algorithm watcher 1310 monitors images or other sensor data from the camera 1204 or other sensors 1204 and/or inferences from the analysis algorithm 1304. The algorithm watcher 1310 may monitor for degradation of images from the camera 1204 or other sensor data from the other sensors 1204 due to, e.g., lighting changes, dust, noise, vibration, etc. The algorithm watcher 1310 may also monitor for degradation of the analysis algorithm 1304, such as a change in error rate or a change in a confidence level of inferences of the analysis algorithm 1304. The algorithm watcher 1310 may create a profile of images received based on KPIs of the analysis algorithm 1304. The profile may include, e.g., image characteristics (such as a histogram of the image in terms of colors, brightness, etc.), frequency of images of interest (such as frequency of images detected as containing an object, frequency of images flagged and tagged such as defect detected or any other tag added by the algorithm, confidence level of the algorithm etc.), and/or the like. If, for example. The algorithm watcher 1310 observes an average confidence level of the algorithm drop from, e.g., 80% to 70%, a change in the environment may be causing the system 1200 to operate in a less desirable state. The algorithm watcher 1310 may store profiles in a database for that can be used to determine whether and how a result from the analysis algorithm 1304 or is otherwise not desirable. If drift of the algorithm is detected, the algorithm watcher 1310 may alert the system integrator and other components such as the configuration recommender 1314. The algorithm watcher 1310 may receive recommendations from the configuration recommender 1314, which the algorithm watcher 1310 may implement. In some embodiments, the algorithm watcher 1310 may implement recommendations after receiving approval from a system integrator.

The configuration recommender 1314 is configured to receive alerts from the algorithm watcher 1310 of degradation of camera images and/or inferences from the algorithm watcher 1310. The configuration recommender 1314 may then query the sub-tuning catalog 1312 for possible actions to take based on the learned sub-tuning actions. The configuration recommender 1314 may both determine how to fix a degradation that is occurring as well as predict a future degradation that may occur. The configuration recommender 1314 may then provide recommended configuration changes to the configuration watcher 1308 that can be expected to fix or prevent a degradation. The configuration recommender 1314 may recommend a configuration based on factors such as a camera model or manufacturer, camera location, etc. For example, the configuration recommender 1314 may recommend a configuration for a camera based on a configuration implemented by a system integrator on a camera with the same manufacturer or similar location.

Figure 14:
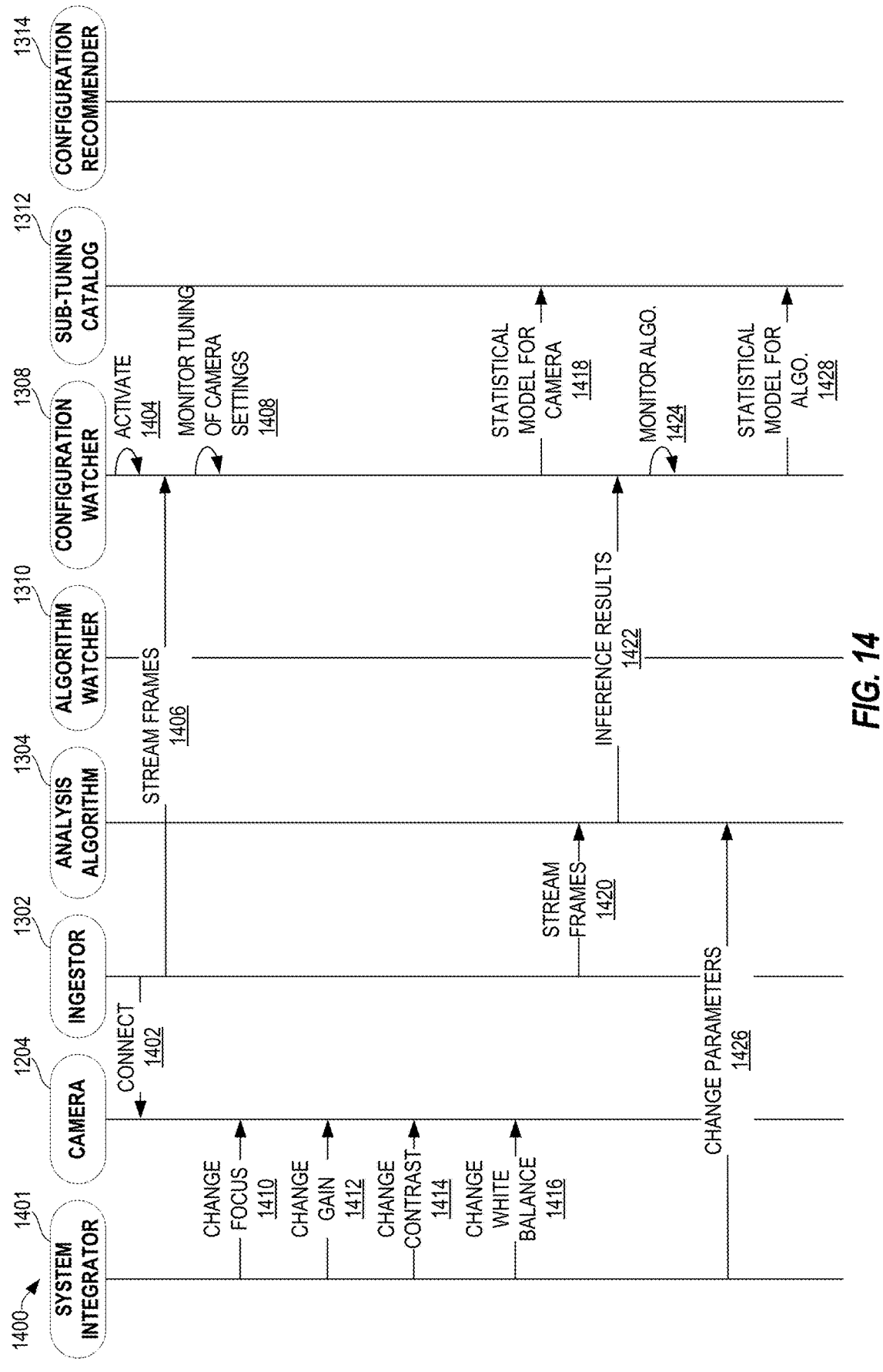
FIG. 14 is a simplified flow diagram showing an example process of monitoring a system integrator adjusting the system of FIG. 12.

FIG. 14 is a simplified flow diagram showing an example process 1400 of monitoring a system integrator 1301 adjusting the system 1200 of FIG. 12. It should be appreciated that the depicted process 1400 is merely one possible embodiment, and other embodiments may include fewer, more, or different steps that may be executed in a different order. The process 1400 begins at block 1402, in which the ingestor 1302 connects to the camera 1204 or other sensors 1204. In block 1404, the configuration watcher 1308 is activated, and the configuration watcher 1308 can stream frames from cameras 1204 or other data from sensors 1204 in block 1406 from the ingestor 1302. The frames may include camera setting metadata, such as zoom, white balance, contrast, gain, etc. Other sensor data may include audio data, vibration data, other optical data, temperature data, etc. The configuration watcher 1308 may also have access to the model, resolution, dynamic behavior, and other information about the camera 1204 or other sensors 1204. The configuration watcher 1308 may also have access to information about the data pipeline, detail of the algorithm used, KPIs, camera or other sensor deployment location, lighting conditions, information of the process being inspected, etc.

The system integrator 1401 can then manually adjust parameters of the camera 1204 or other sensors 1204, as the configuration watcher 1308 monitors tuning of sensor settings in block 1408. For example, the system integrator 1401 may change the focus of the camera 1204 in block 1410, change gain of the camera 1204 in block 1412, change contrast of the camera 1204 in block 1414, and change white balance of the camera in block 1416. The configuration watcher 1308 may build a statistical model for adjusting settings of the camera 1204 or other sensor 1204 using, e.g., a state machine algorithm such as a Bayes network. As the system integrator 1401 will typically go through a form of a set of sub-tuning until the performance converges to an acceptable value, the configuration watcher 1308 can learn the approach used by the system integrator 1401. The configuration watcher 1308 can also learn whether the variations are relatively small or relatively large. As the system integrator 1401 is adjusting parameters of the camera 1204, the ingestor 1302 streams frame to the analysis algorithm 1304 in block 1420, which performs image processing using a machine-learning-based algorithm to determine, e.g., whether a particular part of a manufacturing process is being done correctly. The analysis algorithm 1304 sends inference results to the configuration watcher in block 1422. The inference results may include, e.g., an indication of whether an error is present along with a confidence value that the error is present. The configuration watcher 1308 monitors the output of the algorithm in block 1424 as the system integrator 1401 is adjusting settings of the camera 1204, allowing the configuration watcher 1308 to determine how KPIs are being impacted. The configuration watcher 1308 may also save the frames or other sensor data, inference results, actions of the system integrator 1401, etc. (e.g., in the inference database 1306) for potential playback or analysis at a later point in time. All of the sub-tuning steps and their impact may be saved in the sub-tuning catalog 1312, which may be used by, e.g., the algorithm watcher 1310 or during the tuning of another camera 1204 or other sensor 1204. The system integrator 1401 may also change parameters of the algorithm in block 1426. The configuration watcher 1308 may monitor such changes and develop a statistical model for the adjusting of the algorithm in block 1428.

Figure 15:
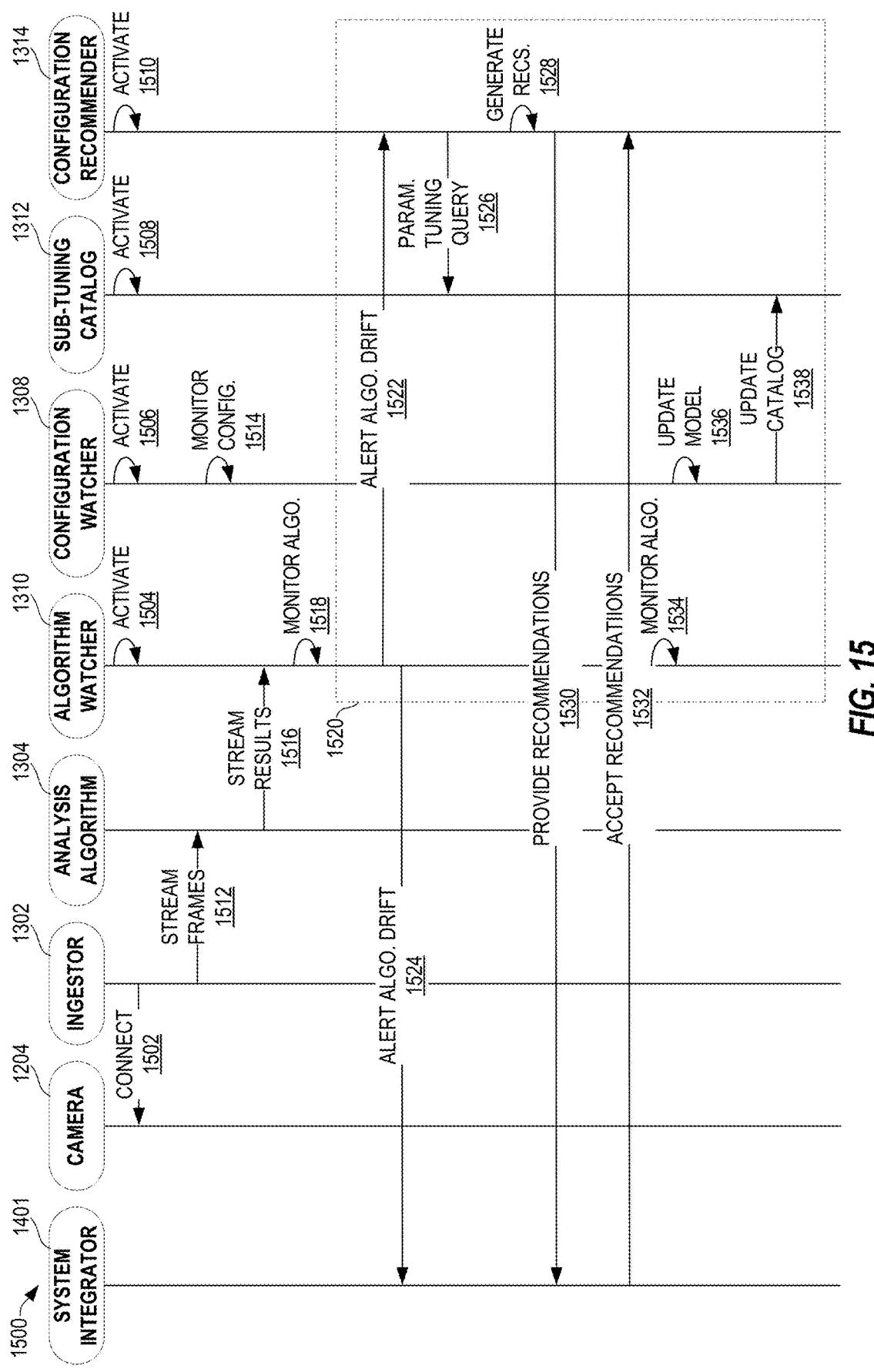
FIG. 15 is a simplified flow diagram showing an example process of monitoring and adjusting the system of FIG. 12.

FIG. 15 is a simplified flow diagram showing an example process 14500 of monitoring a process that may be executed by the system 1200 of FIG. 12. It should be appreciated that the depicted process 1500 is merely one possible embodiment, and other embodiments may include fewer, more, or different steps that may be executed in a different order. When the process 1500 begins, the ingestor 1302 connects to the camera 1204 and/or other sensors 1204, the algorithm watcher 1310 activates in block 1504, the configuration watcher 1308 activates in block 1506, the sub-tuning catalog 1312 activates in block 1508, and the configuration recommender 1314 activates in block 1510.

In block 1512, the ingestor 1302 steams frames or other sensor data to the analysis algorithm 1304. As the ingestor 1302 is streaming frames or other sensor data, the configuration watcher 1308 monitors for any changes in the configuration of, e.g., the camera 1204, other sensors 1204, or the analysis algorithm 1304 in block 1514. In block 1516, the analysis algorithm 1304 streams inference results as well as metadata, such as the frames, other sensor data, camera metadata, etc., to the algorithm watcher 1310. The algorithm watcher 1310 monitors the analysis algorithm 1304 in block 1518, such as by creating a profile of images received based on KPIs of the analysis algorithm 1304. The profile may include, e.g., image characteristics (such as a histogram of the image in terms of colors, brightness, etc.), characteristics of audio or other sensor data, frequency of images of interest (such as frequency of images detected as containing an object, frequency of images flagged and tagged such as defect detected or any other tag added by the algorithm, confidence level of the algorithm etc.), and/or the like. If, for example. The algorithm watcher 1310 observes an average confidence level of the algorithm drop from, e.g., 80% to 70%, a change in the environment may be causing the system 1200 to operate in a less desirable state.

The configuration watcher 1308 may then compare profiles of the images received or profiles of other sensor data to what the configuration watcher 1308 expects based on past experience. For example, if the system 1200 is monitoring a process in a factory, the environment may tend to be fairly stable. A sudden change in, e.g., color scheme may indicate a large change in the environment and/or the camera 1204 or other sensor 1204, either of which may require retuning and/or retraining. The configuration watcher 1308 may use statistical models to determine whether the quality of data from the camera 1204 or other sensors 1204 is shifting or whether there is a shift in metrics such as inference confidence from the analysis algorithm 1304.

If a shift in the analysis algorithm 1304 is detected, the algorithm watcher 1310 enters a loop 1520 to attempt to improve the inference results of the analysis algorithm 1304. The algorithm watcher 1310 alerts the configuration recommender 1314 in block 1522 and alerts the system integrator 1401 in block 1524. In block 1526, the configuration recommender 1314 then queries the sub-tuning catalog 1312, which was populated with models for tuning the camera 1204, other sensors 1204, and/or the analysis algorithm 1304 by the configuration watcher 1308 during the setup and deployment of the system 1200. The sub-tuning catalog 1312 may use tuning models it generated to recommend how to mitigate the changes in the camera 1204 and/or the analysis algorithm 1304. For example, the sub-tuning catalog 1312 may recommend changing, e.g., the zoom, white balance, contrast, gain, focus, etc. In the illustrative embodiment, the sub-tuning catalog 1312 provides the recommendation to the system integrator 1401 in block 1530, which the system integrator 1401 may accept in block 1532. The sub-tuning catalog 1312 may provide an indication of an estimated improvement in KPIs resulting from the changes. In some embodiments, some or all of the recommendations of the sub-tuning catalog 1312 may be applied automatically. For example, the sub-tuning catalog 1312 may provide a confidence level in the change and a policy supports automatic changes.

The algorithm watcher 1310 will continue to monitor the algorithm in block 1534. The configuration watcher 1308 can use output of the algorithm to update the model of the camera 1204 and/or the algorithm in block 1536. The configuration watcher 1308 may update the sub-tuning catalog based on the updated model in block 1538.

The algorithm watcher 1310 continues to monitor the performance of the analysis algorithm 1304, repeating the loop 1520 to improve performance of the analysis algorithm 1304. In some embodiments, the configuration recommender 1314 will test the changes in a sandbox environment (e.g., in a separate virtual machine) before deploying the changes to a production environment. For example, the camera 1204 may support multiple configurations and/or changes may be able to be simulated using filters in software rather than applied directly to the camera 1204.

I. Example Edge Computing Implementations

Additional examples of the presently described method, system, and device embodiments include the following, non-limiting implementations. Each of the following non-limiting examples may stand on its own or may be combined in any permutation or combination with any one or more of the other examples provided below or throughout the present disclosure.

As referred to below, an "apparatus of" an edge computing node is meant to refer to a "component" of "node," such as of a central node, central server, server, client node, client computing node, client device, client or user, as the component is defined above. A client, client node, or client compute/computing node may refer to an edge computing node that is serving as a client device and, in the examples below, may perform training of a global model using local data, which the client may wish to keep private (e.g., from other nodes). The "apparatus" as referred to herein may refer, for example, to a processor such as processor 852 of edge computing node 850 of FIG. 8, or to the processor 852 of FIG. 8 along with any other components of the edge computing node 850 of FIG. 8, or, for example to circuitry corresponding to a computing node 515 or 523 with virtualized processing capabilities as described in FIG. 5.

EXAMPLES

Example 1 includes a system comprising a camera; a compute node (e.g., end points 160 of FIG. 1, compute nodes 515 or 525 of FIG. 5, edge computing node 850 of FIG. 8, client compute node 902 of FIG. 9, etc.) comprising a processor and a memory, the compute node coupled to the camera; and one or more machine-readable media comprising a plurality of instructions that, when executed by the processor, causes the compute node to monitor one or more adjustments provided by a system integrator to one or more settings of the camera or of an analysis algorithm, wherein the analysis algorithm is to analyze images from the camera to determine inference results; monitor inference results of the analysis algorithm; determine that inference results of the analysis algorithm have degraded; and adjust, in response to a determination that inference results of the analysis algorithm have degraded, the one or more settings of the camera or of the analysis algorithm based on the one or more adjustments provided by the system integrator.

Example 2 includes the subject matter of Example 1, and wherein to adjust the one or more settings of the camera or of the analysis algorithm based on the one or more adjustments provided by the system integrator comprises to automatically adjust the one or more settings of the camera or of the analysis algorithm.

Example 3 includes the subject matter of any of Examples 1 and 2, and wherein to adjust the one or more settings of the camera or of the analysis algorithm based on the one or more adjustments provided by the system integrator comprises provide a recommendation to adjust the one or more settings of the camera or of the analysis algorithm to the system integrator; receive approval from the system integrator to adjust the one or more settings of the camera or of the analysis algorithm; and adjust the one or more settings of the camera or of the analysis algorithm in response to receipt of approval from the system integrator.

Example 4 includes the subject matter of any of Examples 1-3, and wherein to monitor the one or more adjustments provided by the system integrator to the one or more settings of the camera or of the analysis algorithm comprises to monitor the one or more adjustments provided by the system integrator to the one or more settings of the camera, wherein the plurality of instructions further cause the compute node to generate a statistical model for the camera based on the one or more adjustments provided by the system integrator to the one or more settings of the camera.

Example 5 includes the subject matter of any of Examples 1-4, and wherein to monitor the one or more adjustments provided by the system integrator to the one or more settings of the camera or of the analysis algorithm comprises to monitor the one or more adjustments provided by the system integrator to the analysis algorithm, wherein the plurality of instructions further cause the compute node to generate a statistical model for the analysis algorithm based on the one or more adjustments provided by the system integrator to the analysis algorithm.

Example 6 includes the subject matter of any of Examples 1-5, and wherein to monitor the one or more adjustments provided by the system integrator to the one or more settings of the camera or of the analysis algorithm comprises to monitor an adjustment made to a focus, a gain, a contrast, a white balance of the camera, or other image capture or camera configuration characteristics.

Example 7 includes the subject matter of any of Examples 1-6, and wherein to determine that the inference results of the analysis algorithm have degraded comprises to determine that confidence values of the inference results of the analysis algorithm have decreased.

Example 8 includes the subject matter of any of Examples 1-7, and wherein the plurality of instructions further cause the compute node to adjust one or more settings of a second camera different from the camera based on one or more adjustments provided by the system integrator to the one or more settings of the camera.

Example 9 includes the subject matter of any of Examples 1-8, and wherein to adjust the one or more settings of the camera or of the analysis algorithm comprises to adjust the one or more settings of the camera or of the analysis algorithm based on one or more key performance indicators of the analysis algorithm.

Example 10 includes the subject matter of any of Examples 1-9, and further including a second camera, wherein the second camera has the same manufacturer as the first camera, wherein the plurality of instructions further cause the compute node to adjust one or more settings on the second camera at least partially based on the manufacturer of the second camera being the same as the first camera.

Example 11 includes the subject matter of any of Examples 1-10, and further including a second camera, wherein the second camera has a similar location as the first camera, wherein the plurality of instructions further cause the compute node to adjust one or more settings on the second camera at least partially based on the location of the second camera being similar to the first camera.

Example 12 includes the subject matter of any of Examples 1-11, and wherein the plurality of instructions further cause the compute node to create a profile corresponding to one or more degraded or non-desirable images, wherein to determine that inference results of the analysis algorithm have degraded comprises to determine that inference results of the analysis algorithm have degraded based on the created profile.

Example 13 includes the subject matter of any of Examples 1-12, and wherein the system further comprises one or more additional sensors selected from the group consisting of a microphone, a vibration sensor, and a temperature sensor, wherein the plurality of instructions further causes the compute node to monitor one or more adjustments provided by a system integrator to one or more settings of the one or more additional sensors, wherein the analysis algorithm is to analyze data from the one or more additional sensors to determine inference results; monitor inference results of the analysis algorithm; determine that inference results of the analysis algorithm have degraded; and adjust, in response to a determination that inference results of the analysis algorithm have degraded, the one or more settings of the one or more additional sensors based on the one or more adjustments provided by the system integrator.

Example 14 includes a method comprising monitoring, by a compute node (e.g., end points 160 of FIG. 1, compute nodes 515 or 525 of FIG. 5, edge computing node 850 of FIG. 8, client compute node 902 of FIG. 9, etc.), one or more adjustments provided by a system integrator to one or more settings of a camera or of an analysis algorithm, wherein the analysis algorithm is to analyze images from the camera to determine inference results; monitoring, by the compute node, inference results of the analysis algorithm; determining, by the compute node, that inference results of the analysis algorithm have degraded; and adjusting, by the compute node and in response to a determination that inference results of the analysis algorithm have degraded, the one or more settings of the camera or of the analysis algorithm based on the one or more adjustments provided by the system integrator.

Example 15 includes the subject matter of Example 14, and wherein adjusting the one or more settings of the camera or of the analysis algorithm based on the one or more adjustments provided by the system integrator comprises automatically adjusting the one or more settings of the camera or of the analysis algorithm.

Example 16 includes the subject matter of any of Examples 14 and 15, and wherein adjusting the one or more settings of the camera or of the analysis algorithm based on the one or more adjustments provided by the system integrator comprises providing a recommendation to adjust the one or more settings of the camera or of the analysis algorithm to a system integrator; receiving approval from the system integrator to adjust the one or more settings of the camera or of the analysis algorithm; and adjusting the one or more settings of the camera or of the analysis algorithm in response to receipt of approval from the system integrator.

Example 17 includes the subject matter of any of Examples 14-16, and wherein monitoring the one or more adjustments provided by the system integrator to the one or more settings of the camera or of the analysis algorithm comprises monitoring the one or more adjustments provided by the system integrator to the one or more settings of the camera, the method further comprising generating, by the compute node, a statistical model for the camera based on the one or more adjustments provided by the system integrator to the one or more settings of the camera.

Example 18 includes the subject matter of any of Examples 14-17, and wherein monitoring the one or more adjustments provided by the system integrator to the one or more settings of the camera or of the analysis algorithm comprises monitoring the one or more adjustments provided by the system integrator to the analysis algorithm, the method further comprising generating, by the compute node, a statistical model for the analysis algorithm based on the one or more adjustments provided by the system integrator to the analysis algorithm.

Example 19 includes the subject matter of any of Examples 14-18, and wherein monitoring the one or more adjustments provided by the system integrator to the one or more settings of the camera or of the analysis algorithm comprises monitoring an adjustment made to a focus, a gain, a contrast, a white balance of the camera, or other image capture or camera configuration characteristics.

Example 20 includes the subject matter of any of Examples 14-19, and wherein determining that the inference results of the analysis algorithm have degraded comprises determining that confidence values of the inference results of the analysis algorithm have decreased.

Example 21 includes the subject matter of any of Examples 14-20, and further including adjusting, by the compute node, one or more settings of a second camera different from the camera based on one or more adjustments provided by the system integrator to the one or more settings of the camera.

Example 22 includes the subject matter of any of Examples 14-21, and wherein adjusting the one or more settings of the camera or of the analysis algorithm comprises adjusting the one or more settings of the camera or of the analysis algorithm based on one or more key performance indicators of the analysis algorithm.

Example 23 includes the subject matter of any of Examples 14-22, and further including adjusting, by the compute node, one or more settings on a second camera, wherein the second camera has the same manufacturer as the first camera, wherein adjusting one or more settings on the second camera comprises adjusting one or more settings on the second camera at least partially based on the manufacturer of the second camera being the same as the first camera.

Example 24 includes the subject matter of any of Examples 14-23, and further including adjusting, by the compute node, one or more settings on a second camera, wherein the second camera has a similar location as the first camera, wherein adjusting one or more settings on the second camera comprises adjusting one or more settings on the second camera at least partially based on the location of the second camera being similar to the first camera.

Example 25 includes the subject matter of any of Examples 14-24, and further including creating, by the compute node, a profile corresponding to one or more degraded or non-desirable images, wherein determining that inference results of the analysis algorithm have degraded comprises determining that inference results of the analysis algorithm have degraded based on the created profile.

Example 26 includes the subject matter of any of Examples 14-25, and further including monitoring, by the compute node, one or more adjustments provided by a system integrator to one or more settings of one or more additional sensors selected from the group consisting of a microphone, a vibration sensor, and a temperature sensor, wherein the analysis algorithm is to analyze data from the one or more additional sensors to determine inference results; monitoring, by the compute node, inference results of the analysis algorithm; determining, by the compute node, that inference results of the analysis algorithm have degraded; and adjusting, by the compute node and in response to a determination that inference results of the analysis algorithm have degraded, the one or more settings of the one or more additional sensors based on the one or more adjustments provided by the system integrator.

Example 27 includes a system comprising means for monitoring one or more adjustments provided by a system integrator to one or more settings of a camera or of an analysis algorithm, wherein the analysis algorithm is to analyze images from the camera to determine inference results; means for monitoring inference results of the analysis algorithm; means for determining that inference results of the analysis algorithm have degraded; and means for adjusting, in response to a determination that inference results of the analysis algorithm have degraded, the one or more settings of the camera or of the analysis algorithm based on the one or more adjustments provided by the system integrator.

Example 28 includes the subject matter of Example 27, and wherein the means for adjusting the one or more settings of the camera or of the analysis algorithm based on the one or more adjustments provided by the system integrator comprises means for automatically adjusting the one or more settings of the camera or of the analysis algorithm.

Example 29 includes the subject matter of any of Examples 27 and 28, and wherein the means for adjusting the one or more settings of the camera or of the analysis algorithm based on the one or more adjustments provided by the system integrator comprises means for providing a recommendation to adjust the one or more settings of the camera or of the analysis algorithm to a system integrator; means for receiving approval from the system integrator to adjust the one or more settings of the camera or of the analysis algorithm; and means for adjusting the one or more settings of the camera or of the analysis algorithm in response to receipt of approval from the system integrator.

Example 30 includes the subject matter of any of Examples 27-29, and wherein the means for monitoring the one or more adjustments provided by the system integrator to the one or more settings of the camera or of the analysis algorithm comprises means for monitoring the one or more adjustments provided by the system integrator to the one or more settings of the camera, the system further comprising means for generating a statistical model for the camera based on the one or more adjustments provided by the system integrator to the one or more settings of the camera.

Example 31 includes the subject matter of any of Examples 27-30, and wherein the means for monitoring the one or more adjustments provided by the system integrator to the one or more settings of the camera or of the analysis algorithm comprises means for monitoring the one or more adjustments provided by the system integrator to the analysis algorithm, the system further comprising means for generating a statistical model for the analysis algorithm based on the one or more adjustments provided by the system integrator to the analysis algorithm.

Example 32 includes the subject matter of any of Examples 27-31, and wherein the means for monitoring the one or more adjustments provided by the system integrator to the one or more settings of the camera or of the analysis algorithm comprises means for monitoring an adjustment made to a focus, a gain, a contrast, a white balance of the camera, or other image capture or camera configuration characteristics.

Example 33 includes the subject matter of any of Examples 27-32, and wherein the means for determining that the inference results of the analysis algorithm have degraded comprises means for determining that confidence values of the inference results of the analysis algorithm have decreased.

Example 34 includes the subject matter of any of Examples 27-33, and further including means for adjusting the one or more settings of a second camera different from the camera based on one or more adjustments provided by the system integrator to the one or more settings of the camera.

Example 35 includes the subject matter of any of Examples 27-34, and wherein the means for adjusting the one or more settings of the camera or of the analysis algorithm comprises means for adjusting the one or more settings of the camera or of the analysis algorithm based on one or more key performance indicators of the analysis algorithm.

Example 36 includes the subject matter of any of Examples 27-35, and further including a second camera, wherein the second camera has the same manufacturer as the first camera; and means for adjusting one or more settings on the second camera at least partially based on the manufacturer of the second camera being the same as the first camera.

Example 37 includes the subject matter of any of Examples 27-36, and further including a second camera, wherein the second camera has a similar location as the first camera; and means for adjusting one or more settings on the second camera at least partially based on the location of the second camera being similar to the first camera.

Example 38 includes the subject matter of any of Examples 27-37, and further including means for creating a profile corresponding to one or more degraded or non-desirable images, wherein the means for determining that inference results of the analysis algorithm have degraded comprises means for determining that inference results of the analysis algorithm have degraded based on the created profile.

Example 39 includes the subject matter of any of Examples 27-38, and wherein the system further comprises one or more additional sensors selected from the group consisting of a microphone, a vibration sensor, and a temperature sensor, further comprising means for monitoring one or more adjustments provided by a system integrator to one or more settings of the one or more additional sensors, wherein the analysis algorithm is to analyze data from the one or more additional sensors to determine inference results; means for monitoring inference results of the analysis algorithm; means for determining that inference results of the analysis algorithm have degraded; and means for adjusting, in response to a determination that inference results of the analysis algorithm have degraded, the one or more settings of the one or more additional sensors based on the one or more adjustments provided by the system integrator.

Example 40 includes one or more computer-readable media comprising a plurality of instructions stored thereon that, when executed, causes a compute node (e.g., end points 160 of FIG. 1, compute nodes 515 or 525 of FIG. 5, edge computing node 850 of FIG. 8, client compute node 902 of FIG. 9, etc.) to monitor one or more adjustments provided by a system integrator to one or more settings of a camera of the compute node or of an analysis algorithm of the compute node, wherein the analysis algorithm is to analyze images from the camera to determine inference results; monitor inference results of the analysis algorithm; determine that inference results of the analysis algorithm have degraded; and adjust, in response to a determination that inference results of the analysis algorithm have degraded, the one or more settings of the camera or of the analysis algorithm based on the one or more adjustments provided by the system integrator.

Example 41 includes the subject matter of Example 40, and wherein to adjust the one or more settings of the camera or of the analysis algorithm based on the one or more adjustments provided by the system integrator comprises to automatically adjust the one or more settings of the camera or of the analysis algorithm.

Example 42 includes the subject matter of any of Examples 40 and 41, and wherein to adjust the one or more settings of the camera or of the analysis algorithm based on the one or more adjustments provided by the system integrator comprises provide a recommendation to adjust the one or more settings of the camera or of the analysis algorithm to a system integrator; receive approval from the system integrator to adjust the one or more settings of the camera or of the analysis algorithm; and adjust the one or more settings of the camera or of the analysis algorithm in response to receipt of approval from the system integrator.

Example 43 includes the subject matter of any of Examples 40-42, and wherein to monitor the one or more adjustments provided by the system integrator to the one or more settings of the camera or of the analysis algorithm comprises to monitor the one or more adjustments provided by the system integrator to the one or more settings of the camera, wherein the plurality of instructions further cause the compute node to generate a statistical model for the camera based on the one or more adjustments provided by the system integrator to the one or more settings of the camera.

Example 44 includes the subject matter of any of Examples 40-43, and wherein to monitor the one or more adjustments provided by the system integrator to the one or more settings of the camera or of the analysis algorithm comprises to monitor the one or more adjustments provided by the system integrator to the analysis algorithm, wherein the plurality of instructions further cause the compute node to generate a statistical model for the analysis algorithm based on the one or more adjustments provided by the system integrator to the analysis algorithm.

Example 45 includes the subject matter of any of Examples 40-44, and wherein to monitor the one or more adjustments provided by the system integrator to the one or more settings of the camera or of the analysis algorithm comprises to monitor an adjustment made to a focus, a gain, a contrast, a white balance of the camera, or other image capture or camera configuration characteristics.

Example 46 includes the subject matter of any of Examples 40-45, and wherein to determine that the inference results of the analysis algorithm have degraded comprises to determine that confidence values of the inference results of the analysis algorithm have decreased.

Example 47 includes the subject matter of any of Examples 40-46, and wherein the plurality of instructions further cause the compute node to adjust one or more settings of a second camera different from the camera based on one or more adjustments provided by the system integrator to the one or more settings of the camera.

Example 48 includes the subject matter of any of Examples 40-47, and wherein to adjust the one or more settings of the camera or of the analysis algorithm comprises to adjust the one or more settings of the camera or of the analysis algorithm based on one or more key performance indicators of the analysis algorithm.

Example 49 includes the subject matter of any of Examples 40-48, and wherein the plurality of instructions further cause the compute node to adjust one or more settings on a second camera, wherein the second camera has the same manufacturer as the first camera, wherein to adjust one or more settings on the second camera comprises to adjust one or more settings on the second camera at least partially based on the manufacturer of the second camera being the same as the first camera.

Example 50 includes the subject matter of any of Examples 40-49, and wherein the plurality of instructions further cause the compute node to adjust one or more settings on a second camera, wherein the second camera has a similar location as the first camera, wherein to adjust one or more settings on the second camera comprises to adjust one or more settings on the second camera at least partially based on the location of the second camera being similar to the first camera.

Example 51 includes the subject matter of any of Examples 40-50, and wherein the plurality of instructions further cause the compute node to create a profile corresponding to one or more degraded or non-desirable images, wherein to determine that inference results of the analysis algorithm have degraded comprises to determine that inference results of the analysis algorithm have degraded based on the created profile.

Example 52 includes the subject matter of any of Examples 40-51, and wherein the plurality of instructions further cause the compute node to monitor one or more adjustments provided by a system integrator to one or more settings of one or more additional sensors selected from the group consisting of a microphone, a vibration sensor, and a temperature sensor, wherein the analysis algorithm is to analyze data from the one or more additional sensors to determine inference results; monitor inference results of the analysis algorithm; determine that inference results of the analysis algorithm have degraded; and adjust, in response to a determination that inference results of the analysis algorithm have degraded, the one or more settings of the one or more additional sensors based on the one or more adjustments provided by the system integrator.

Another example includes an apparatus substantially as shown and described herein.

Another example includes a method substantially as shown and described herein.

Another example implementation is the apparatus of the Example of the paragraph above, further including a system memory coupled to the processor, the system memory to store instructions, the processor to execute the instructions to perform the training.

Another example implementation is an edge computing system including aspects of network functions, acceleration functions, acceleration hardware, storage hardware, or computation hardware resources, operable to invoke or perform the use cases discussed herein, with use of the examples herein, or other subject matter described herein.

Another example implementation is an edge computing system adapted for supporting client mobility, vehicle-to-vehicle (V2V), vehicle-to-everything (V2X), or vehicle-to-infrastructure (V2I) scenarios, and optionally operating according to ETSI MEC specifications, operable to invoke or perform the use cases discussed herein, with use of the examples herein, or other subject matter described herein.

Another example implementation is an edge computing system adapted for mobile wireless communications, including configurations according to an 3GPP 4G/LTE or 5G network capabilities, operable to invoke or perform the use cases discussed herein, with use of the Examples above, or other subject matter described herein.

Any of the above-described Examples may be combined with any other example (or combination of examples), unless explicitly stated otherwise. Aspects described herein can also implement a hierarchical application of the scheme for example, by introducing a hierarchical prioritization of usage for different types of users (e.g., low/medium/high priority, etc.), based on a prioritized access to the spectrum e.g. with highest priority to tier-1 users, followed by tier-2, then tier-3, etc. users, etc. Some of the features in the present disclosure are defined for network elements (or network equipment) such as Access Points (APs), eNBs, gNBs, core network elements (or network functions), application servers, application functions, etc. Any embodiment discussed herein as being performed by a network element may additionally or alternatively be performed by a UE, or the UE may take the role of the network element (e.g., some or all features defined for network equipment may be implemented by a UE).

Although these implementations have been described with reference to specific exemplary aspects, it will be evident that various modifications and changes may be made to these aspects without departing from the broader scope of the present disclosure. Many of the arrangements and processes described herein can be used in combination or in parallel implementations to provide greater bandwidth/throughput and to support edge services selections that can be made available to the edge systems being serviced. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects and other aspects not specifically described herein will be apparent to those of skill in the art upon reviewing the above description.

What is claimed is:

1. A system comprising:
a camera;
a compute node comprising a processor and a memory, the compute node coupled to the camera; and
one or more machine-readable media comprising a plurality of instructions that, when executed by the processor, causes the compute node to:
monitor one or more adjustments made by a system integrator to one or more settings of the camera or of an analysis algorithm, wherein the analysis algorithm is to analyze images from the camera to determine inference results;
monitor inference results of the analysis algorithm;
determine that inference results of the analysis algorithm have degraded; and
adjust, in response to a determination that inference results of the analysis algorithm have degraded, the one or more settings of the camera or of the analysis algorithm based on the one or more adjustments made by the system integrator.

2. The system of claim 1, wherein to adjust the one or more settings of the camera or of the analysis algorithm based on the one or more adjustments made by the system integrator comprises to automatically adjust the one or more settings of the camera or of the analysis algorithm.

3. The system of claim 1, wherein to adjust the one or more settings of the camera or of the analysis algorithm based on the one or more adjustments made by the system integrator comprises:
provide a recommendation to adjust the one or more settings of the camera or of the analysis algorithm to the system integrator;
receive approval from the system integrator to adjust the one or more settings of the camera or of the analysis algorithm; and
adjust the one or more settings of the camera or of the analysis algorithm in response to receipt of approval from the system integrator.

4. The system of claim 1, wherein to monitor the one or more adjustments made by the system integrator to the one or more settings of the camera or of the analysis algorithm comprises to monitor the one or more adjustments made by the system integrator to the one or more settings of the camera, wherein the plurality of instructions further cause the compute node to:
generate a statistical model for the camera based on the one or more adjustments made by the system integrator to the one or more settings of the camera.

5. The system of claim 1, wherein to monitor the one or more adjustments made by the system integrator to the one or more settings of the camera or of the analysis algorithm comprises to monitor the one or more adjustments made by the system integrator to the analysis algorithm, wherein the plurality of instructions further cause the compute node to:
generate a statistical model for the analysis algorithm based on the one or more adjustments made by the system integrator to the analysis algorithm.

6. The system of claim 1, wherein to monitor the one or more adjustments made by the system integrator to the one or more settings of the camera or of the analysis algorithm comprises to monitor an adjustment made to a focus, a gain, a contrast, or a white balance of the camera.

7. The system of claim 1, wherein to determine that the inference results of the analysis algorithm have degraded comprises to determine that confidence values of the inference results of the analysis algorithm have decreased.

8. The system of claim 1, wherein the plurality of instructions further cause the compute node to:
adjust one or more settings of a second camera different from the camera based on one or more adjustments made by the system integrator to the one or more settings of the camera.

9. The system of claim 1, wherein to adjust the one or more settings of the camera or of the analysis algorithm comprises to adjust the one or more settings of the camera or of the analysis algorithm based on one or more key performance indicators of the analysis algorithm.

10. The system of claim 1, further comprising a second camera, wherein the second camera has the same manufacturer as the camera,
wherein the plurality of instructions further cause the compute node to adjust one or more settings on the second camera at least partially based on the manufacturer of the second camera being the same as the camera.

11. The system of claim 1, further comprising a second camera, wherein the second camera has a similar location as the camera,
wherein the plurality of instructions further cause the compute node to adjust one or more settings on the second camera at least partially based on the location of the second camera being similar to the camera.

12. The system of claim 1, wherein the plurality of instructions further cause the compute node to:
create a profile corresponding to one or more degraded or non-desirable images; and
wherein to determine that inference results of the analysis algorithm have degraded comprises to determine that inference results of the analysis algorithm have degraded based on the created profile.

13. The system of claim 1, wherein the system further comprises one or more additional sensors selected from a microphone, a vibration sensor, or a temperature sensor,
wherein the plurality of instructions further causes the compute node to:
monitor one or more adjustments provided by a system integrator to one or more settings of the one or more additional sensors, wherein the analysis algorithm is to analyze data from the one or more additional sensors to determine inference results;
monitor inference results of the analysis algorithm;
determine that inference results of the analysis algorithm have degraded; and
adjust, in response to a determination that inference results of the analysis algorithm have degraded, the one or more settings of the one or more additional sensors based on the one or more adjustments provided by the system integrator.

14. A method comprising:
monitoring, by a compute node, one or more adjustments made by a system integrator to one or more settings of a camera or of an analysis algorithm, wherein the analysis algorithm is to analyze images from the camera to determine inference results;
monitoring, by the compute node, inference results of the analysis algorithm;
determining, by the compute node, that inference results of the analysis algorithm have degraded; and adjusting, by the compute node and in response to a determination that inference results of the analysis algorithm have degraded, the one or more settings of the camera or of the analysis algorithm based on the one or more adjustments made by the system integrator.

15. The method of claim 14, wherein adjusting the one or more settings of the camera or of the analysis algorithm based on the one or more adjustments made by the system integrator comprises:

providing a recommendation to adjust the one or more settings of the camera or of the analysis algorithm to a system integrator;

receiving approval from the system integrator to adjust the one or more settings of the camera or of the analysis algorithm; and adjusting the one or more settings of the camera or of the analysis algorithm in response to receipt of approval from the system integrator.

16. The method of claim 14, wherein monitoring the one or more adjustments made by the system integrator to the one or more settings of the camera or of the analysis algorithm comprises monitoring the one or more adjustments made by the system integrator to the one or more settings of the camera, the method further comprising:

generating, by the compute node, a statistical model for the camera based on the one or more adjustments made by the system integrator to the one or more settings of the camera.

17. The method of claim 14, wherein monitoring the one or more adjustments made by the system integrator to the one or more settings of the camera or of the analysis algorithm comprises monitoring the one or more adjustments made by the system integrator to the analysis algorithm, the method further comprising:

generating, by the compute node, a statistical model for the analysis algorithm based on the one or more adjustments made by the system integrator to the analysis algorithm.

18. The method of claim 14, wherein determining that the inference results of the analysis algorithm have degraded comprises determining that confidence values of the inference results of the analysis algorithm have decreased.

19. The method of claim 14, further comprising:

adjusting, by the compute node, one or more settings of a second camera different from the camera based on one or more adjustments made by the system integrator to the one or more settings of the camera.

20. One or more non-transitory computer-readable media comprising a plurality of instructions stored thereon that, when executed, causes a compute node to:

monitor one or more adjustments made by a system integrator to one or more settings of a camera of the compute node or of an analysis algorithm of the compute node, wherein the analysis algorithm is to analyze images from the camera to determine inference results;

monitor inference results of the analysis algorithm;

determine that inference results of the analysis algorithm have degraded; and adjust, in response to a determination that inference results of the analysis algorithm have degraded, the one or more settings of the camera or of the analysis algorithm based on the one or more adjustments made by the system integrator.

21. The one or more non-transitory computer-readable media of claim 20, wherein to adjust the one or more settings of the camera or of the analysis algorithm based on the one or more adjustments made by the system integrator comprises:

provide a recommendation to adjust the one or more settings of the camera or of the analysis algorithm to a system integrator;

receive approval from the system integrator to adjust the one or more settings of the camera or of the analysis algorithm; and adjust the one or more settings of the camera or of the analysis algorithm in response to receipt of approval from the system integrator.

22. The one or more non-transitory computer-readable media of claim 20, wherein to monitor the one or more adjustments made by the system integrator to the one or more settings of the camera or of the analysis algorithm comprises to monitor the one or more adjustments made by the system integrator to the one or more settings of the camera, wherein the plurality of instructions further cause the compute node to:

generate a statistical model for the camera based on the one or more adjustments made by the system integrator to the one or more settings of the camera.

23. The one or more non-transitory computer-readable media of claim 20, wherein to monitor the one or more adjustments made by the system integrator to the one or more settings of the camera or of the analysis algorithm comprises to monitor the one or more adjustments made by the system integrator to the analysis algorithm, wherein the plurality of instructions further cause the compute node to:

generate a statistical model for the analysis algorithm based on the one or more adjustments made by the system integrator to the analysis algorithm.

24. The one or more non-transitory computer-readable media of claim 20, wherein to determine that the inference results of the analysis algorithm have degraded comprises to determine that confidence values of the inference results of the analysis algorithm have decreased.

25. The one or more non-transitory computer-readable media of claim 20, wherein the plurality of instructions further cause the compute node to:

adjust one or more settings of a second camera different from the camera based on one or more adjustments made by the system integrator to the one or more settings of the camera.

* * * * *